US011616403B2

(12) United States Patent
Zeine et al.

(10) Patent No.: US 11,616,403 B2
(45) Date of Patent: *Mar. 28, 2023

(54) WIRELESS SIGNAL TRANSMISSION SYSTEMS AND METHODS

(71) Applicant: Ossia Inc., Redmond, WA (US)

(72) Inventors: Hatem Ibrahim Zeine, Woodinville, WA (US); Siamak Ebadi, San Francisco, CA (US)

(73) Assignee: Ossia Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,724

(22) Filed: Dec. 24, 2021

(65) Prior Publication Data

US 2022/0123600 A1 Apr. 21, 2022

Related U.S. Application Data

(63) Continuation of application No. 16/578,718, filed on Sep. 23, 2019, now Pat. No. 11,271,433, which is a (Continued)

(51) Int. Cl.
*H02J 50/23* (2016.01)
*H02J 50/80* (2016.01)
*H02J 50/40* (2016.01)

(52) U.S. Cl.
CPC ............. *H02J 50/23* (2016.02); *H02J 50/40* (2016.02); *H02J 50/80* (2016.02)

(58) Field of Classification Search
CPC .............. H02J 50/20–27; H02J 50/40–402
See application file for complete search history.

(56) References Cited

U.S. PATENT DOCUMENTS 8,854,176 B2 10/2014 Zeine
9,893,555 B1 2/2018 Leabman et al.
(Continued)

FOREIGN PATENT DOCUMENTS

JP 2013-538548 A 10/2013
KR 2012-0037965 A 4/2012

OTHER PUBLICATIONS

European Patent Application No. 16876892.7, Extended European Search Report, 7 pages, dated Apr. 11, 2019.
(Continued)

*Primary Examiner* — Toan T Vu
*Assistant Examiner* — David A Shiao

(57) ABSTRACT

Systems and methods for leveraging multipath wireless transmissions for charging devices within multipath signaling environment. Techniques according to the present technology include determining a received signal strength of a radio frequency signal received via a plurality of paths at two or more antennas of a plurality of antennas of an antenna array. The techniques also include configuring parameters for transmission of a wireless power signal over one or more paths of the plurality of paths for which the received signal strength exceeds a threshold value. The techniques further include directing at least a portion of the plurality of antennas to transmit the wireless power signal over the one or more paths according to the parameters. Resulting signal transmissions may thus be directionally biased toward least lossy pathways between a wireless power transmitter and a device in need of receiving wireless power.

20 Claims, 22 Drawing Sheets

Related U.S. Application Data continuation of application No. 15/381,957, filed on Dec. 16, 2016, now Pat. No. 10,424,972.

(60) Provisional application No. 62/268,651, filed on Dec. 17, 2015.

(56) References Cited

U.S. PATENT DOCUMENTS

| | | | |
|---|---|---|---|
| 9,966,765 B1 | 5/2018 | Leabman et al. | |
| 2010/0259447 A1 | 10/2010 | Crouch | |
| 2010/0315045 A1 | 12/2010 | Zeine | |
| 2011/0151789 A1 | 6/2011 | Viglione et al. | |
| 2012/0326660 A1 | 12/2012 | Lu et al. | |
| 2013/0328696 A1 | 12/2013 | Drachmann | |
| 2014/0159653 A1* | 6/2014 | Von Novak | H04B 5/0037 320/108 |
| 2014/0217967 A1 | 8/2014 | Zeine et al. | |
| 2014/0252813 A1 | 9/2014 | Lee et al. | |
| 2014/0368048 A1 | 12/2014 | Leabman et al. | |
| 2015/0015194 A1 | 1/2015 | Leabman et al. | |
| 2015/0022010 A1 | 1/2015 | Leabman et al. | |
| 2015/0022373 A1 | 1/2015 | Bommer et al. | |
| 2015/0084584 A1 | 3/2015 | Monks et al. | |
| 2017/0288475 A1* | 10/2017 | Lee | H04W 8/005 |
| 2018/0091002 A1* | 3/2018 | Park | H02J 50/20 |

OTHER PUBLICATIONS

European Patent Application No. 16876892.7, Examination Report, 4 pages, dated Dec. 4, 2019.
Japanese Patent Application No. 2018-530697, Office Action, 7 pages, dated Aug. 6, 2019.
Korean Patent Application No. 2018-7020321, Office Action, 7 pages, dated Nov. 19, 2019.
Stafanick, George, "Frequency, Cycle, Wavelength, Amplitude and Phase," Aruba Blogs, 5 pages, Jan. 12, 2015.

* cited by examiner

WIRELESS SIGNAL TRANSMISSION SYSTEMS AND METHODS

CROSS REFERENCE TO RELATED APPLICATIONS

This application is a continuation of U.S. patent application Ser. No. 16/578,718 filed on Sep. 23, 2019, and issued as U.S. Pat. No. 11,271,433 on Mar. 8, 2022; which is a continuation of U.S. patent application Ser. No. 15/381,957 filed on Dec. 16, 2016, and issued as U.S. Pat. No. 10,424,972 on Sep. 24, 2019; which claims priority to and benefit from U.S. Provisional Patent Application No. 62/268,651 filed on Dec. 17, 2015, the entire contents of each of which is incorporated by reference herein.

TECHNICAL FIELD

The technology described herein relates generally to the field of wireless power transmission and, more specifically, to wireless power transfer and data communication in multipath vehicle environments.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It is, therefore, desirable to derive power for electronics wirelessly.

Magnetic or induction based coupling requires a charger and the receiver to be in extremely close proximity to one another. Wireless charging of devices across a larger distance, however, requires more advanced mechanisms, such as transmission via radio frequency (RF) signals, ultrasonic transmissions, laser powering, etc., each of which present a number of unique hurdles to commercial success.

Currently, vehicle manufacturers rely heavily on wired solutions for providing power to mobile devices. These solutions can include docking stations, USB ports, or adapters plugged into 12 volt receptacles. However, when there are multiple devices in the vehicle requiring charging, the wires quickly become a tangle, and often there are insufficient ports to service more than one or two devices at any given time.

Some car manufacturers have explored utilizing magnetic or induction based coupling for charging pads integrated into a vehicle's console or dashboard. This solution eliminates the need for wires, but requires the device to be placed in a very specific position. The user is required to forfeit the device during charging, and cannot use the device and still receive charge (due to proximity restraints). As such, most users have been hesitant to adopt such a system. Ideally, a vehicle would allow for wireless charging regardless of device location within the vehicle.

Unfortunately, this type of wireless charging, e.g., over greater distances, within a vehicle poses various unique challenges. For example, the potential locations of devices receiving wireless power and people within a vehicle are generally more limited than in other environments. Moreover, the physical space limitations of a vehicle ensure that passengers are located near both the wireless charger and the devices receiving wireless power. A vehicle also typically has a very crowded footprint resulting in limited line-of-sight possibilities between the devices receiving wireless power and a charger.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

To achieve the foregoing and in accordance with the present invention, systems and methods for leveraging multipath wireless transmissions for high data rate communication and charging of devices, within a vehicle, is provided.

In some embodiments, the method includes deploying a wireless charger within a vehicle interior. This charger may be deployed in the center console, dashboard or ceiling of the vehicle. The wireless charger includes an array of antennas, which may detect an incoming signal from a client device. Each antenna in the array may determine an offset for the received signal, which is then used to tune parameters for each antenna individually. Thus, upon transmission, the resulting signal is directionally biased toward the least lossy paths between the device and the charger. These paths avoid passengers and other sources of signal attenuation. Thus, for a given total power envelope, a greater total signal amplitude may be delivered to the device, with reduced exposure to any occupants of the vehicle.

Additionally, the interior of the vehicle may be provisioned to help improve multipath focusing of transmissions. This may include selection of different materials to increase reflective properties, or even the inclusion of special reflectors, such as a metal mesh into the seat cushion, into the vehicle design. Such systems and methods may be deployed within any vehicle type, including a car, boat, truck, airplane and train, for example. Likewise, while RF transmissions are of particular interest in some embodiments, it is also possible that transmissions could be an ultrasonic acoustic wave, a photonic signal, or magnetic oscillations.

This Summary is provided to introduce a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
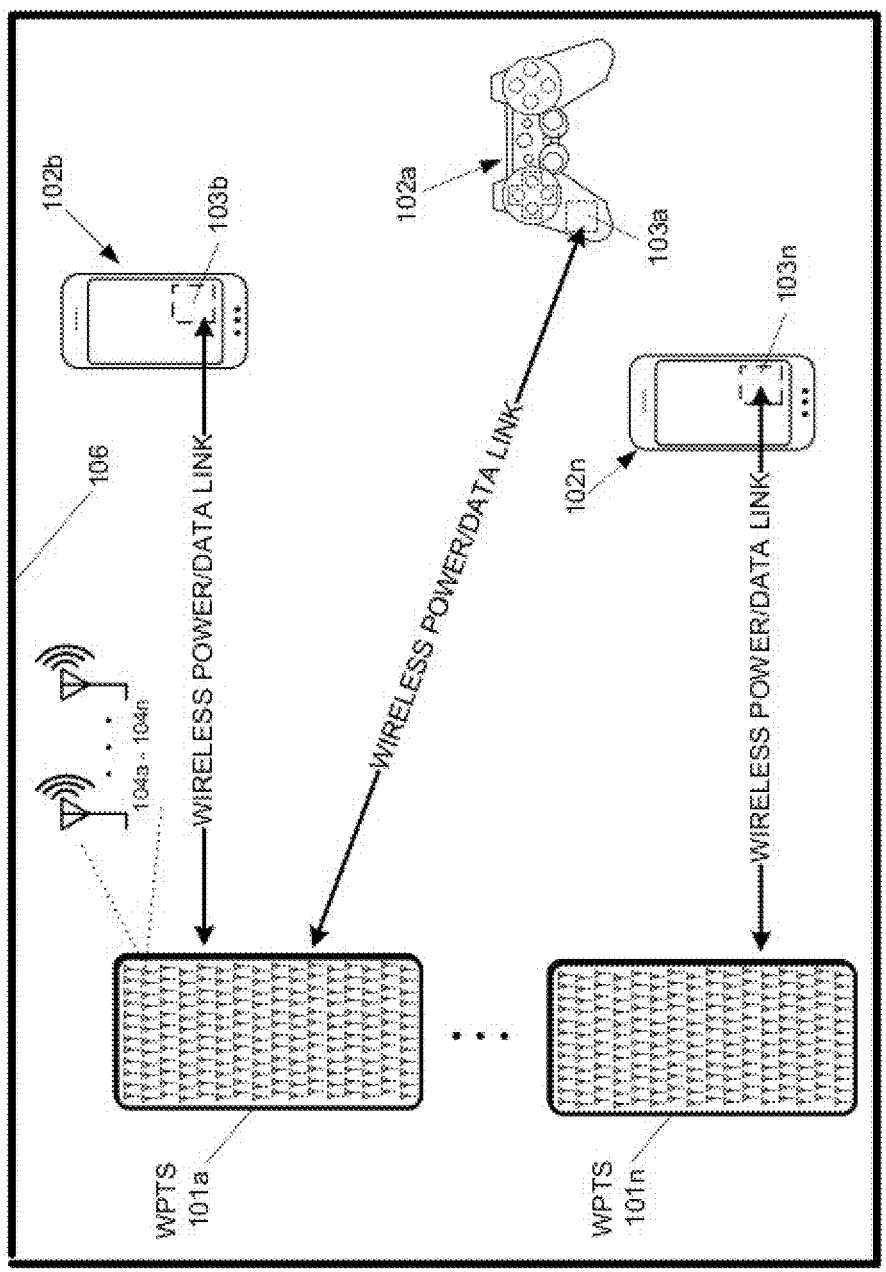
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Power Transmission System Overview/Architecture

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated wireless power receiver clients 103a-103n. As discussed herein, the one or more integrated wireless power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102a-102n. In some embodiments, the antennas are adaptively-phased RF antennas. The wireless power transmission system 101 is capable of determining the appropriate phases with which to deliver a coherent power transmission signal to the wireless power receiver clients 103a-103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the wireless power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary AC power supply in a building. Alternatively, or additionally, one or more of the wireless power transmission systems 101a-101n can be powered by a battery or via other mechanisms, e.g., solar cells, etc.

The wireless power receiver clients 102a-102n and/or the wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel. Alternatively, or additionally, the wireless power receiver clients 103a-103n can direct the wireless devices 102a-102n to communicate with the wireless power transmission system via existing data communications modules. In some embodiments the beacon signal, which is primarily referred to herein as a continuous waveform, can alternatively or additionally take the form of a modulated signal.

Figure 2:
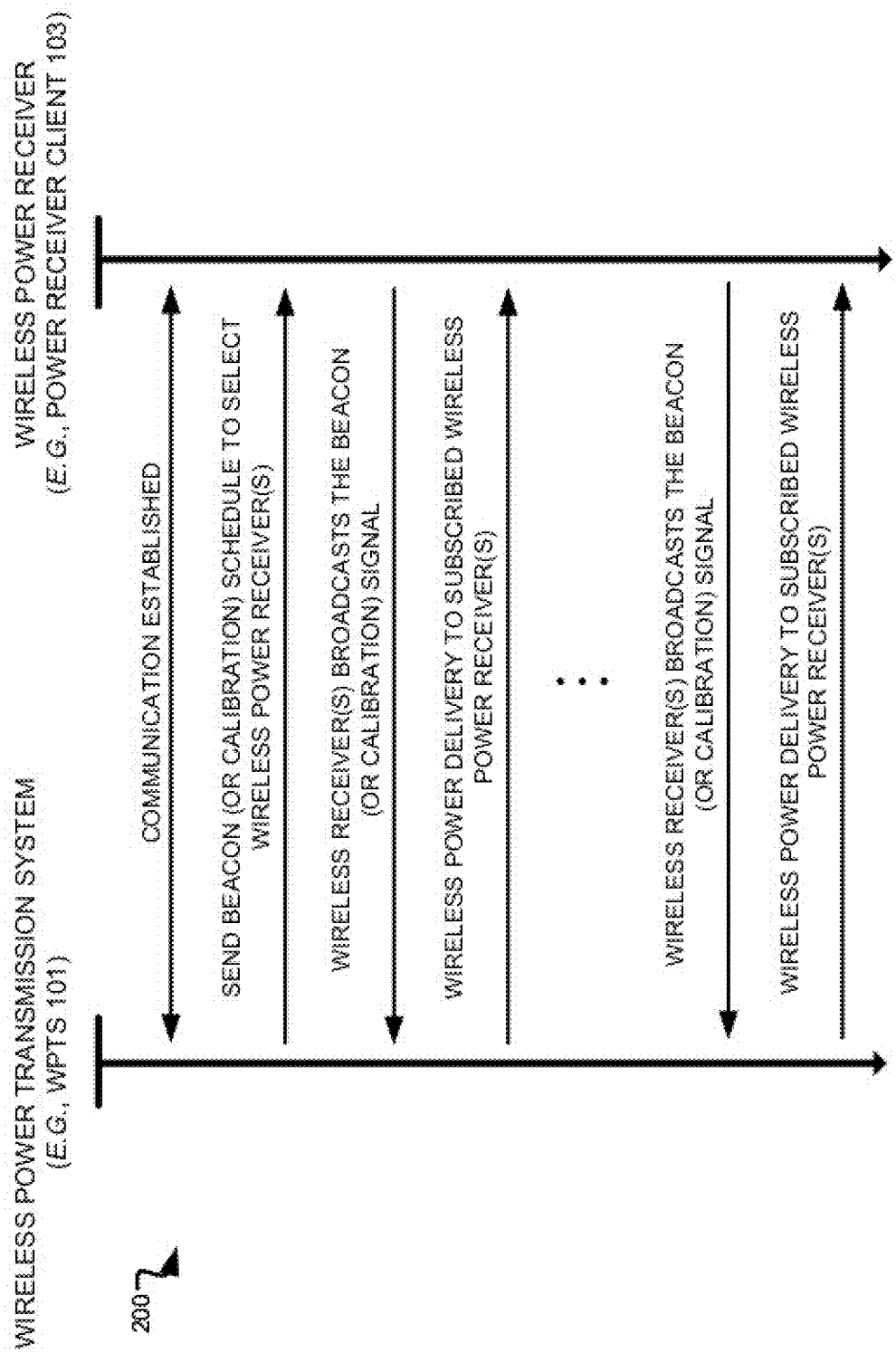
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., BBS cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
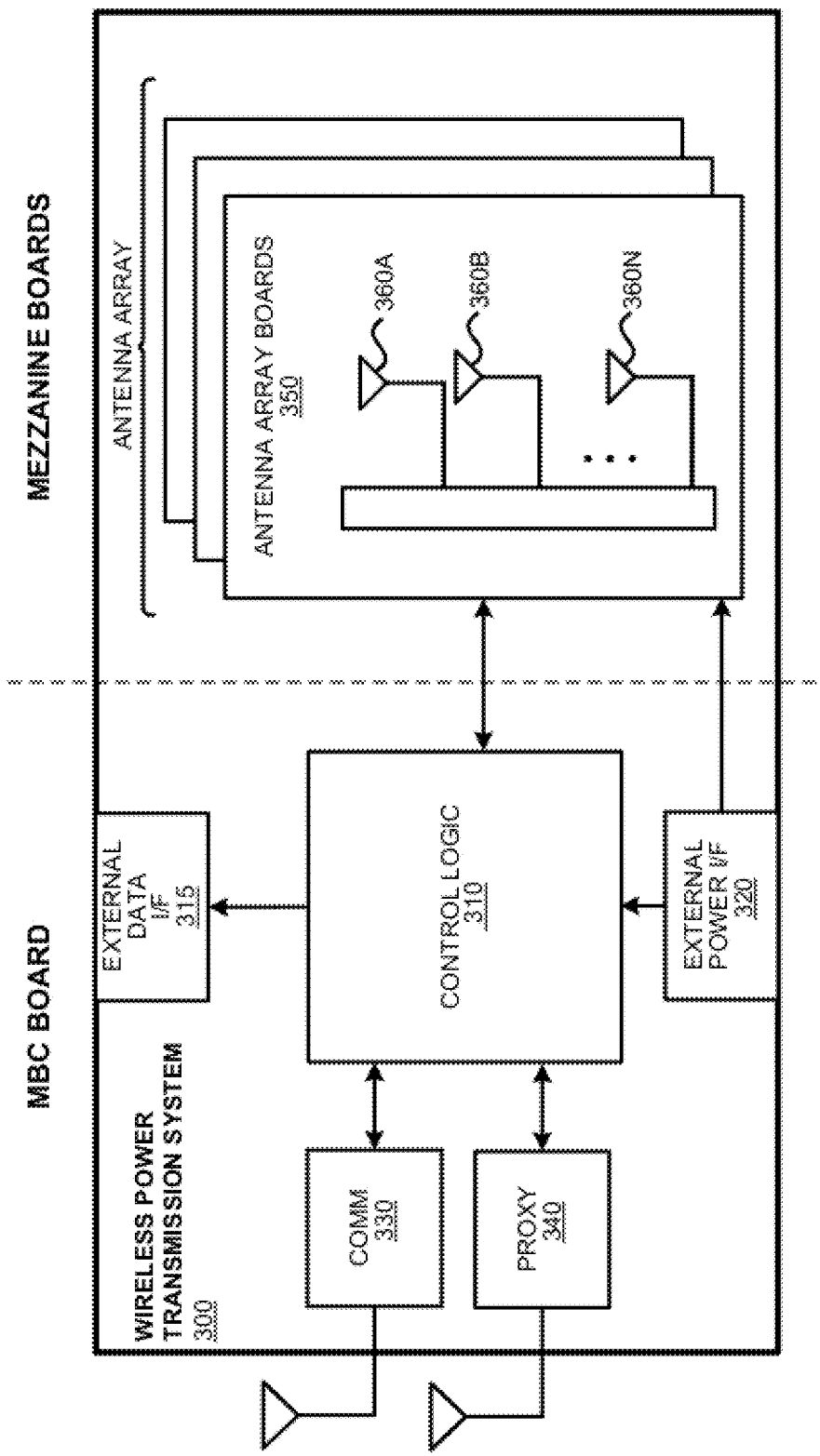
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™ Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™ ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the MBC, which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
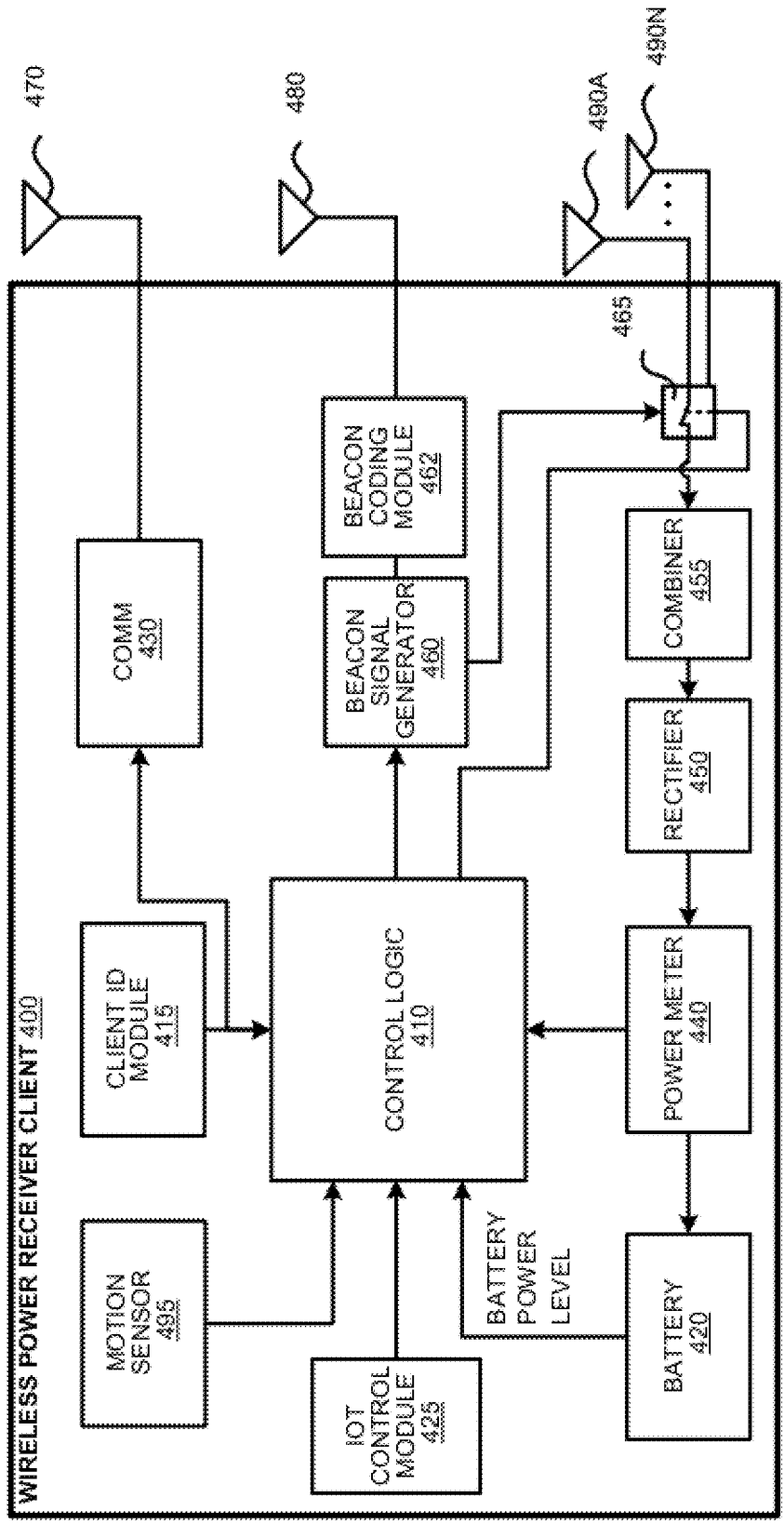
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490*a-n*. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 receives and processes the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the wireless power receiver client 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the wireless power receiver client 400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
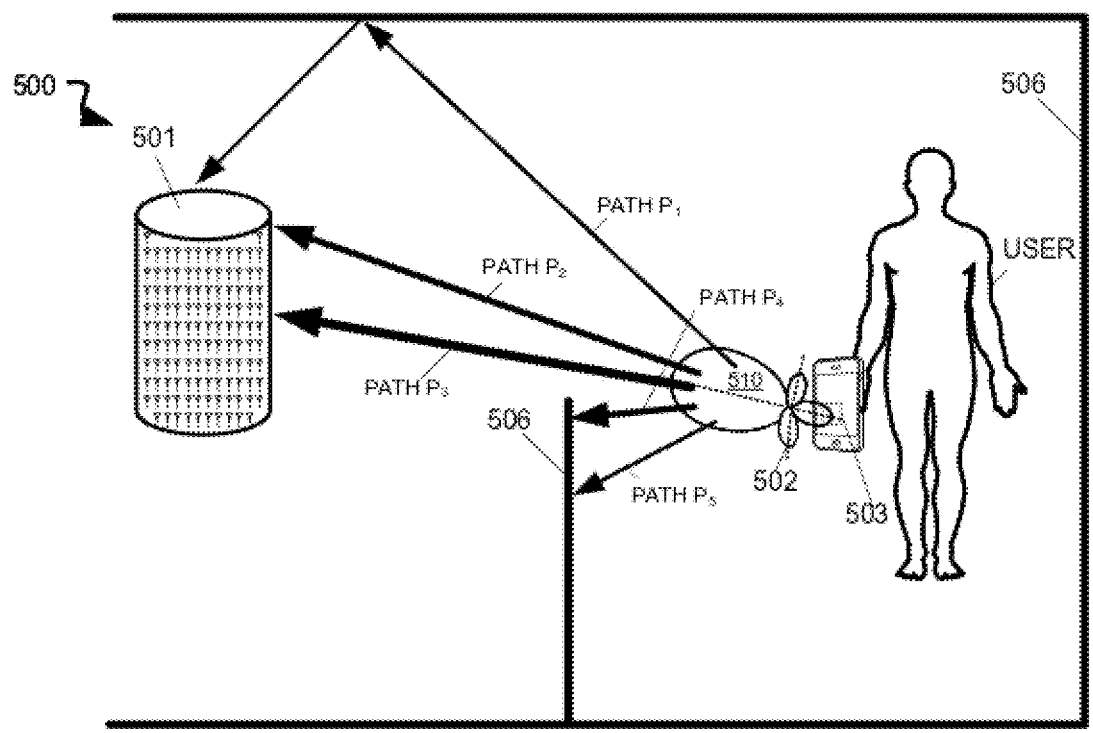
FIGS. 5A and 5B depict diagrams illustrating an example multipath wireless power delivery environment in accordance with some embodiments.
Figure 5B:
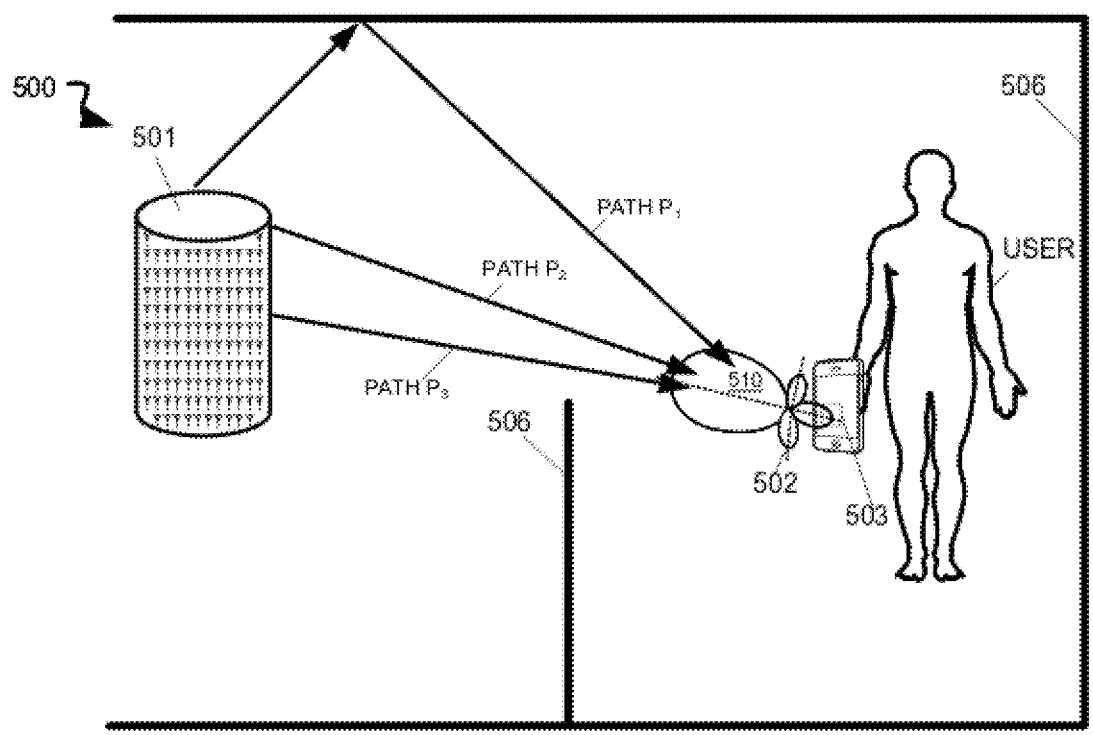

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transmit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

Although the example of FIG. 5A illustrates transmitting a beacon (or calibration) signal in the direction of the radiation and reception pattern 510, it is appreciated that, in some embodiments, beacon signals can alternatively or additionally be omni-directionally transmitted.

II. Wireless Charging in Multipath Vehicle Environments

Attention will now be focused on wireless power delivery and, more specifically, focused wireless power delivery, in environments wherein line-of-sight transmission is not necessarily available. This type of transmission environment is particularly relevant when discussing vehicles due to the nature of the space. For example, a vehicle is often constructed from materials including metals, plastics, etc., which have dielectric constants that are significantly greater than air. Accordingly, these materials have reflective surfaces (both for RF signals and ultrasonic transmissions) that can contribute to partial reflection or absorption of wireless power transmissions.

Moreover, vehicle interiors are often crowded, leading to few direct paths for energy transmission between wireless power transmission systems (or chargers) and devices receiving wireless power. Thus, power may be delivered via paths that reflect off of various surfaces. Furthermore, by applying novel algorithms and processing to the wireless power transmissions, as outlined in U.S. application Ser. No. 14/186,344, entitled "Method and Apparatus for Focused Data Communications," which is incorporated in its entirety by this reference herein, the wireless power (or energy) signals can be made to arrive in phase and simultaneously (or near simultaneously) at a single area via multiple paths thereby effectively generating a 'pulse' of higher energy delivery.

Figure 6A:
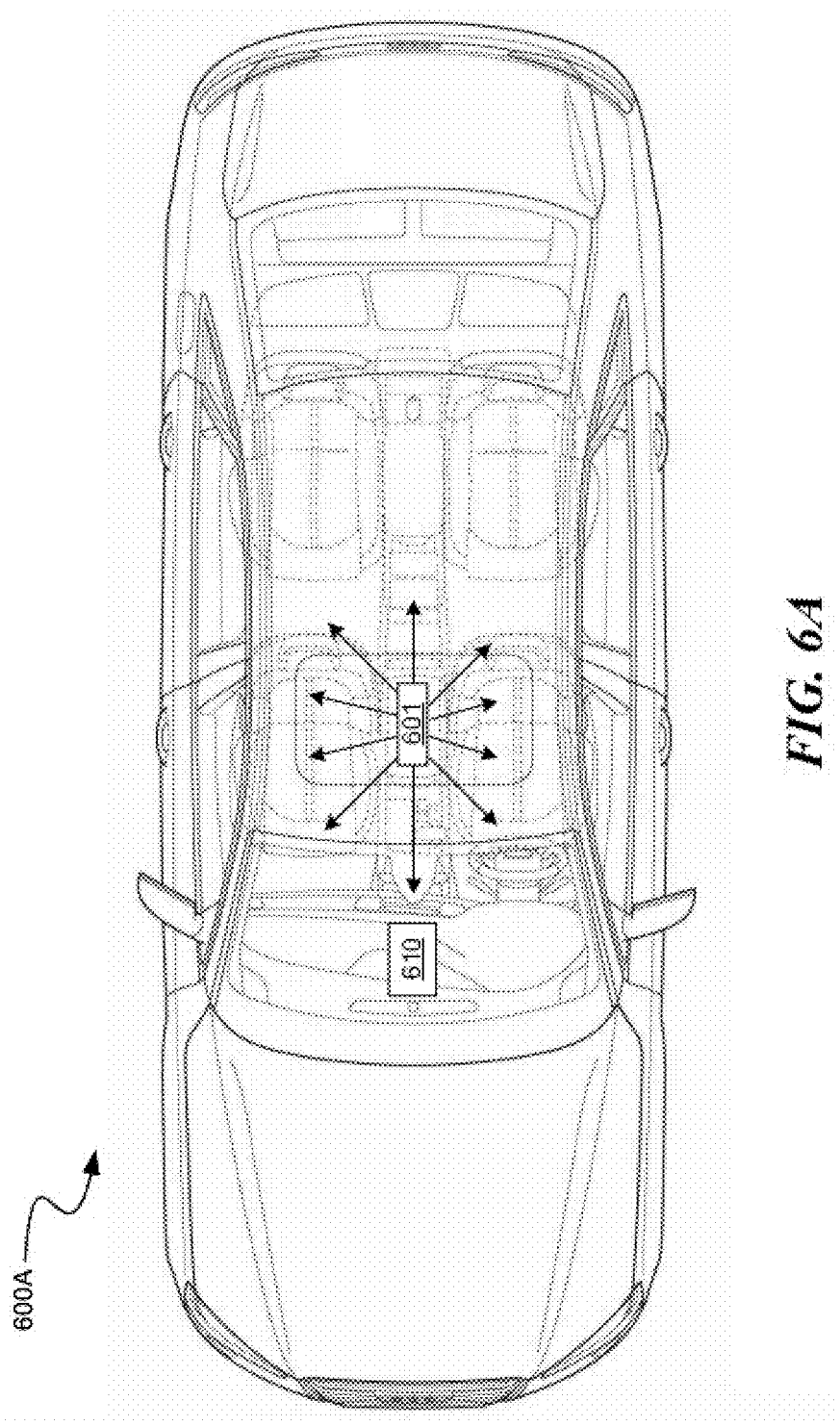
FIGS. 6A and 6B depict diagrams illustrating an example vehicle environment where wireless charging is occurring in accordance with some embodiments.
Figure 6B:
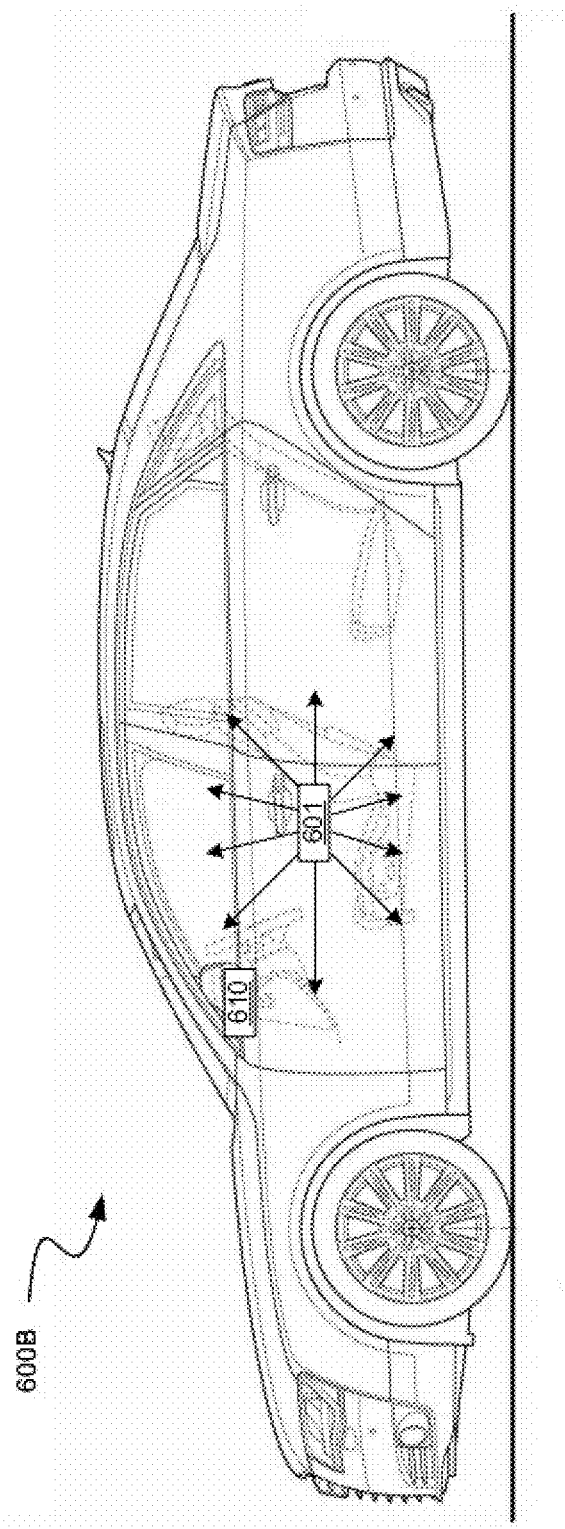

FIGS. 6A and 6B depict top and side views, 600A and 600B, respectively, of an example vehicle in the form of a car with wireless charging capabilities. More specifically, the examples of FIGS. 6A and 6B illustrate a wireless power transmission system (or wireless charger) 601 which may be a stand-alone system, integrated into the vehicle, e.g., during the manufacture process, or otherwise retrofitted or build-in to the vehicle in some other manner In some embodiments, the wireless power transmission system 601 is integrated into the center console of the vehicle. The console charging location provides several advantages. For example, the console is centrally located within the charging environment, is close to statistically common locations where a device receiving wireless power is likely to be placed in the vehicle, and is within a line of sight of the most common locations a device would be placed in the vehicle. In some embodiments, wireless power transmission system 601 may alternately or additionally be placed within the vehicle dashboard, in the ceiling of the vehicle, etc. The above enumerated advantages of locating the charger in the console may apply equally to these other locations.

It can be assumed that if a car is running, a person, e.g., driver, is located in the driver's seat of a car, and thus, if the driver has a device on their person, it is most likely to be located in or around the front seating area of the vehicle. In a typical sedan type car there are two front seats and a rear three-seat bench. Thus, it can be safely assumed that there is a person located in the driver's seat when the vehicle is running and probabilistic models can determine the likelihood of passengers in other seats. Additionally, many newer model cars have pressure sensory input to determine if a passenger is present for seatbelt reminders, etc. If a passenger has a device, it will typically be located near the passenger. For example, in the case of a front passenger, the device is likely located in a passenger's pocket, in the center console, or on the dashboard. Thus, when the passengers' positions are known, this reduces the likely positioning of devices with the vehicle. One unique advantage of a vehicle as a wireless charging environment is that the distances are relatively small between the wireless power transmission system and the device receiving wireless power. Unlike a building, where a device requiring energy may be thirty or more feet away from a wireless power transmission system, the physical confines of a vehicle ensures that the wireless power transmission system and the device receiving wireless power are located relatively close to one another.

As discussed above, when a vehicle is on, it is presumed that a person is located in the driver's seat and thus, if the driver has a device on their person, the device is most likely to be located in or around the front seating area of the vehicle. This places the device directly adjacent to the center console, and when the device receives power, it is likely to be in close proximity to a person. Consequently, total power delivery can be truncated to reduce exposure to the person. The very close distance between the device receiving the wireless power and the wireless power transmission system 601 allows the wireless power transmission system 601 to provide very low power transfers in the direction of the passengers, and yet still have an impact upon device energy levels. In cases where the device located further away, such low transmission would likely be insufficient to provide the device with wireless power.

By way of example, if a device is placed on the dashboard of the car, the device is now located approximately two feet from the wireless power transmission system 601 compared to mere inches. However, placing a phone in the center console or the dashboard is common practice for many people, as it allows rapid access to the device. By locating the wireless power transmission system 601 within the center console, it may be possible to direct the energy transmissions along the central axis of the vehicle in order to ensure the device receives appreciable power regardless of its location within the vehicle. In FIGS. 6A and 6B, a location may be designated within the vehicle at 610, for example, where it is convenient to place the device and where power transmissions are focused. Transmission focusing may rely upon reflective surfaces and/or phase variances across an arrayed antenna, as will be discussed in greater detail below.

Unlike magnetic or induction coupling based charging, which also leverages having a 'spot' for the phone, the type of focused wireless charging discussed herein does not require direct placement of the phone on a charging pad. Rather, the device cradle indicated in the FIGS. 6A and 6B may merely allow for the user to have a convenient location to store the device. The device will receive charging regardless of where or how it is placed in the vehicle, which is a distinct and substantial advantage over any induction-based system. Additionally, if the device is moved, or even in use, charging can continue uninterrupted.

Although not shown in the examples of FIGS. 6A and 6B, in some embodiments, a vehicle may have one or more solar cells (not shown) located on a roof member which could convert solar energy into direct current. This direct current may then be fed to the wireless power transmission system 601 to generate the wireless energy transmissions. Such a system may be particularly beneficial when the system is being installed "after market" or to appeal to the environmentally consciences consumer. Additionally, a solar based system would allow charging when the vehicle was turned off without training the vehicles battery.

Figure 7:
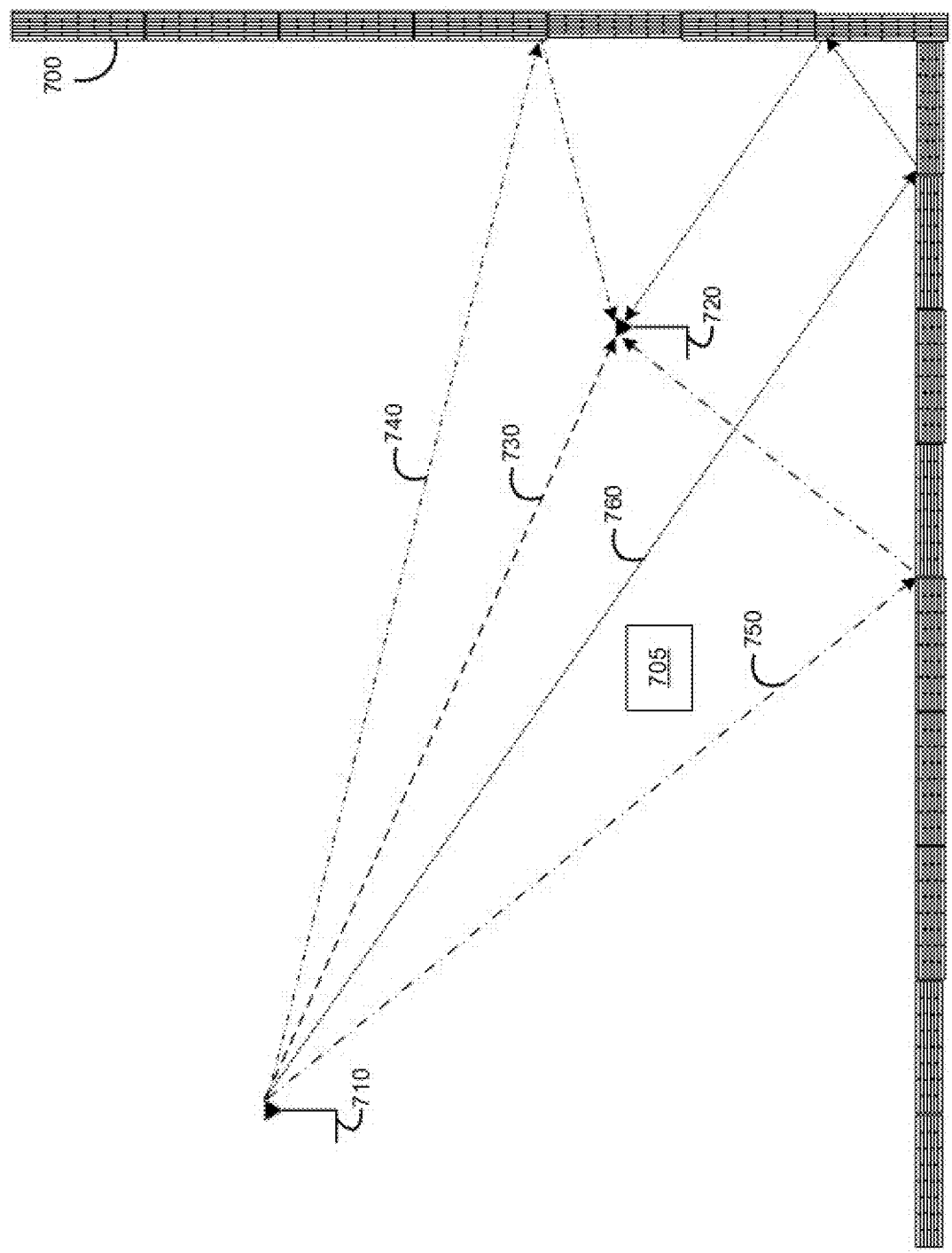
FIG. 7 depicts a simple example two-dimensional enclosure, according to some embodiments.

FIG. 7 depicts a simple example two-dimensional enclosure 700, according to some embodiments. Within enclosure 700 are shown two antennas, 710 and 720, between which power is exchanged, and a representative obstacle 705. As shown in the example of FIG. 7, wireless power is transmitted from antenna 710 is to antenna 720 over various signal paths 730, 740, 750 and 760. Path 730 is a direct path between the antennas, paths 740 and 750 are paths with one reflection, and path 760 is a path with two reflections. These four paths are shown for simplicity, any number of paths, including many paths, are possible. As discussed herein, each path can have any number of reflections. However, due to loss in signal at reflection points, often only direct paths, and those paths with relatively lossless or few reflections are of interest. It should be evident that if antenna 710 is isotropic in two dimensions then almost any direction of radiation emanating from the antenna can trace a path, which, after multiple reflections in some instances, arrives at the receiving antenna 720. Initially it can be assumed that the reflections are symmetric about the normal to the surface (specular reflection) that the ray is reflected from, and exclude the cases where a ray traces its path over and over without arriving at the receiver, since these latter are not particularly interesting and represent wasted power lost in transmission.

The shortest path from the transmitter 710 to the receiver 720 is the direct path 730 which will exhibit the lowest loss. Other paths are longer, involve at least one reflection and, in addition to the transmission loss, except in the case where the reflecting surface is a perfect conductor having no loss, e.g., a resistivity of zero, there will also be loss in the reflector itself. The propagation velocity of the signal is relatively constant and so the phase change per unit length will be the same anywhere in the transmission path. Reflection from a perfect conductor does not involve any loss, however it does cause a phase reversal of the tangential component of the incident wave at the reflecting surface. That is, a single reflection causes a 180° offset in the perceived phase delay. Given this, it may be difficult to determine, absent the path detail, whether the signal is phase shifted due to multiple reflections or if in fact the path length is solely responsible for the measured result.

It is comparatively rare that reflections from walls and objects are loss free and so reflected signals will be weaker than those which take a direct path. Depending on the surface, a mean attenuation of between 2 and 5 decibels (dB) is expected at each reflection and since the relative signal level of every received signal is determinable in such systems, the system may discount certain signal paths as being less desirable than others so that transmitting power to the intended power receiver may take advantage of this by avoiding known lossy paths. For example, the human body takes up a considerable volume within a vehicle. Due to vehicle design, the passengers present are generally relatively stationary (literally belted into a single seat position). The human body is also a very poor reflector, and thus RF transmissions are primarily absorbed upon striking the body. This is not advantageous as it reduces the effectiveness of power delivery and/or communication data rates. Moreover, it is also important to limit exposure to RF energy which may have health or safety implications (real or perceived). Advantageously, the system is capable of identifying lossy paths and avoiding these paths for power transmissions. Accordingly, the system can naturally create (or generate) "null" or dead zone(s) around human occupants in a vehicle.

Although a signal path may not always be reciprocal, e.g., because of the effects of polarization rotation and the fact that the environment can change over time, the latter is piecewise static and it may be assumed that for the most part the propagation from one antenna to another is a reversible process in the short term.

Figure 8:
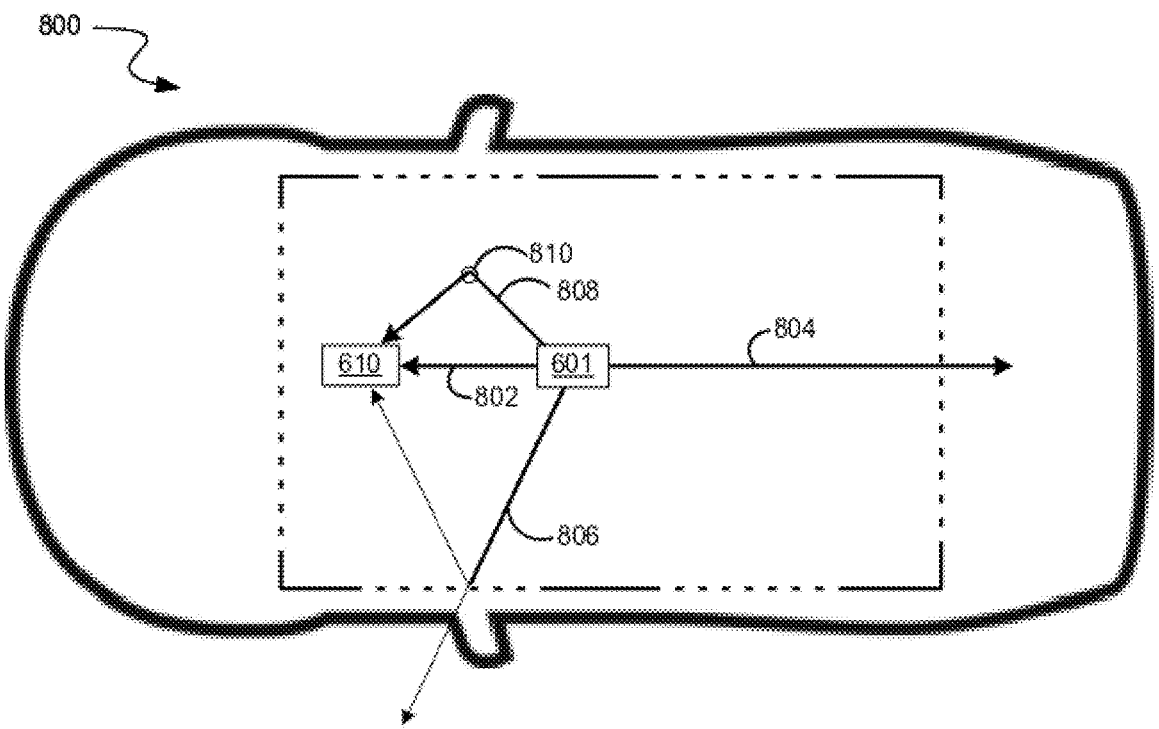
FIG. 8 depicts a diagram illustrating example multi-path transmission within a vehicle, in accordance with some embodiments.

FIG. 8 depicts a diagram illustrating example multi-path transmission within a vehicle 800, in accordance with some embodiments. More specifically, the example of FIG. 8 illustrates various possible paths within vehicle 800 over which wireless power transmission can occur. As shown in the example of FIG. 8, vehicle 800 includes a wireless power transmission system (or charger) 801 which is configured to transmit to a device which the vehicle. As shown, the device receives wireless power at a focusing spot 810. The wireless power transmission system (or charger) 801 may be wireless power transmission system 101 of FIG. 1 or wireless power transmission system 300 of FIG. 3, although alternative configurations are possible. Likewise, the device can be any device having a wireless power receiver client, e.g., wireless power receiver client 103 of FIG. 1 or wireless power receiver client 400 of FIG. 4.

As shown in the example of FIG. 8, a path 802, 804, 808 and 810 are shown. Path 802 is a direct path, path 804 travels away from the device and strikes perpendicular to the rear windshield. Typically, glass employed in a vehicle is relatively transparent to an RF signal which may allow the transmission to exit the vehicle environment. This results in system loss and is generally undesirable. In some embodiments, windows may be treated in the manufacturing process to be reflective to the RF signals being transmitted. For some manufacturers of vehicles, an optimal level of reflectiveness of the interior surfaces may be achieved in order to balance power delivery with the need for the device to communicate externally, e.g., with cellular towers or other data communications.

Based on the transmission mechanism, various surfaces may have different reflective properties. For example, if the energy being transferred is sent as ultrasonic acoustic vibrations, the windows may be very reflective, whereas the vehicle ceiling material may absorb much of the acoustic energy. In order to address this, fabrics facing the vehicle interior may be backed with a plastic membrane that allows even these surfaces to be relatively reflective to acoustic energy.

Returning to a use case where RF signals are used for transmission of the energy, path 806 illustrates an example whereby some of the RF energy is reflected toward the device, and other energy exits through the window glass. In contrast, path 808 strikes the vehicle's ceiling 810. The fabric interior may result in some minor loss of RF amplitude, but the bulk of this signal passes through the relatively thin interior coverings. As shown in the example of FIG. 8, the body of vehicle 800 can be composed of metal, e.g., steel or aluminum, which are excellent reflectors of the RF energy. Additionally, plastics or other composite materials with preferable reflective properties may be incorporated into the vehicle's design to allow for additional RF paths. Thus, energy via path 808 reaches the device with very little loss in intensity. These multiple paths may be relied upon to maximize power delivery, and when combined with temporal modulation of the phase being transmitted, may result in constructive interference at the device (i.e., multipath focusing).

Figure 9:
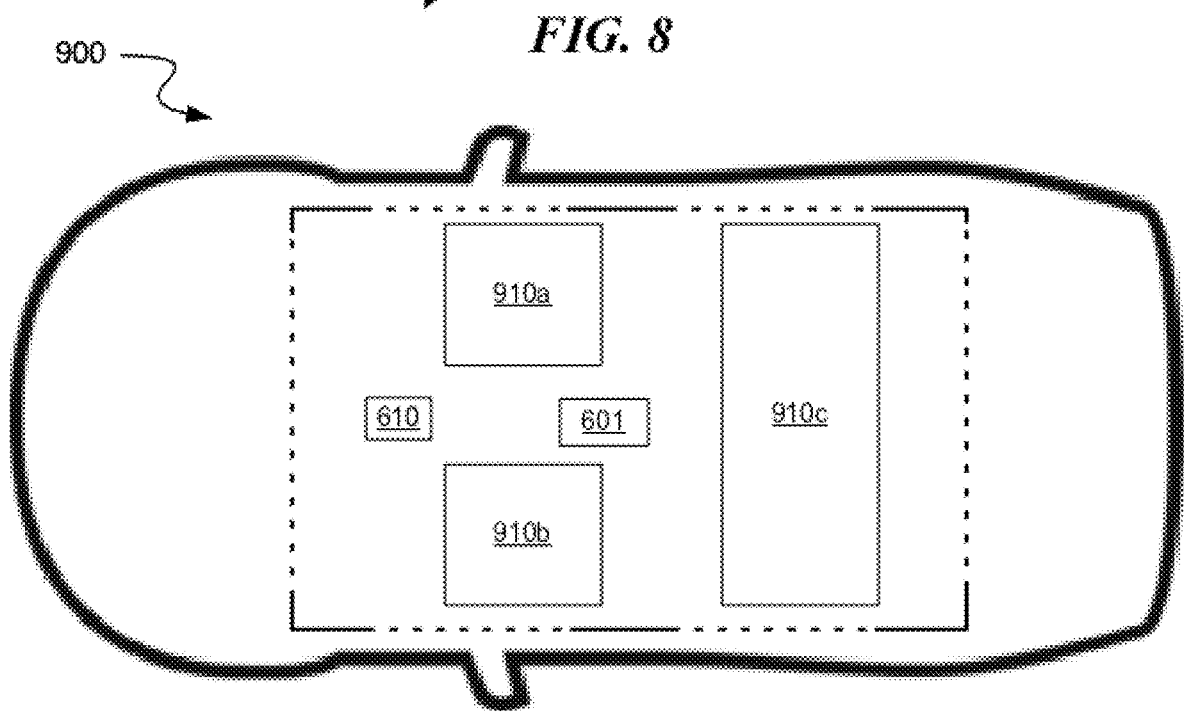
FIG. 9 depicts a diagram having various example reflectors for improving wireless charging performance within a vehicle, in accordance with some embodiments.

FIG. 9 depicts a diagram having various example reflectors for improving wireless charging performance within a vehicle 900, in accordance with some embodiments. More specifically, FIG. 9 illustrates an example of how to further enhance the reflective nature of a vehicle environment through reflective surfaces 910a-910c strategically located within the interior of the vehicle. As previously noted, some level of transparency to RF signals is required to maintain communication between the device and outside sources (such as cellular towers), however, this transparency is a negative factor with regards to wireless power delivery. Nonetheless, not all surfaces impact power delivery and cellular service equally. For example, cell signals are typically being transmitted from the horizon (or overhead). These signals take full advantage of the window placement in vehicles. Few communication signals arrive from below the vehicle, and thus reflective surfaces on the seating or floor of the vehicles would have minimal impact upon cellular service.

In contrast, a wireless power transmission system charger located within the car, having seating or floors that are reflective can significantly impact the number and amplitude of paths available for charging the device. A vehicle floor is already relatively reflective as it is made of steel with a relatively thin carpet covering. Adding sheet steel, or a wire mesh, to floor mats may allow even greater reflection since traditional floor mats are typically thick rubber and carpeting, which may limit signal reflections. Additionally, seating within the vehicle is often flush and prone to absorption of the energy transmissions. Some seating incorporates a wire mesh for warming or heating when a current is applied. Such wire meshes also enhance the reflective properties of the seat. In some embodiments, reflectors 910a-910c comprise metal screens or meshes that are incorporated just below upholstery on the vehicle seats to enhance RF reflections within the vehicle interior.

Additionally, to take advantage of the high reflective nature of a vehicle interior, some embodiments of the currently disclosed system employ an antenna array capable of steering the transmissions to arrive at the destination through the least lossy paths. In order to achieve this multipath focusing, the system must generate one or more test signals that are transmitted. The amplitude, time and phase of the received signals corresponding to the test transmission correspond to different transmission paths. The difference between the phase of the received transmissions across the array may be utilized in order to generate a schedule for the reversed transmission.

FIGS. 10A-10G depict example illustrations of transmissions within a vehicle leveraging the multipath environment, in accordance with some embodiments. More specifically, FIGS. 10A-10G provide various example illustrations for the mechanism of delivering power and communication signals along multiple pathways in order to avoid 'lossy' pathways. As discussed, in some embodiments, the methods leverage antenna arrays to phase the signals to directionally orient the transmissions. In general, the directional transmissions will avoid absorptive surfaces (such as human passengers) thereby introducing increased safety and effectiveness of the charging and/or communication.

Figure 10A:
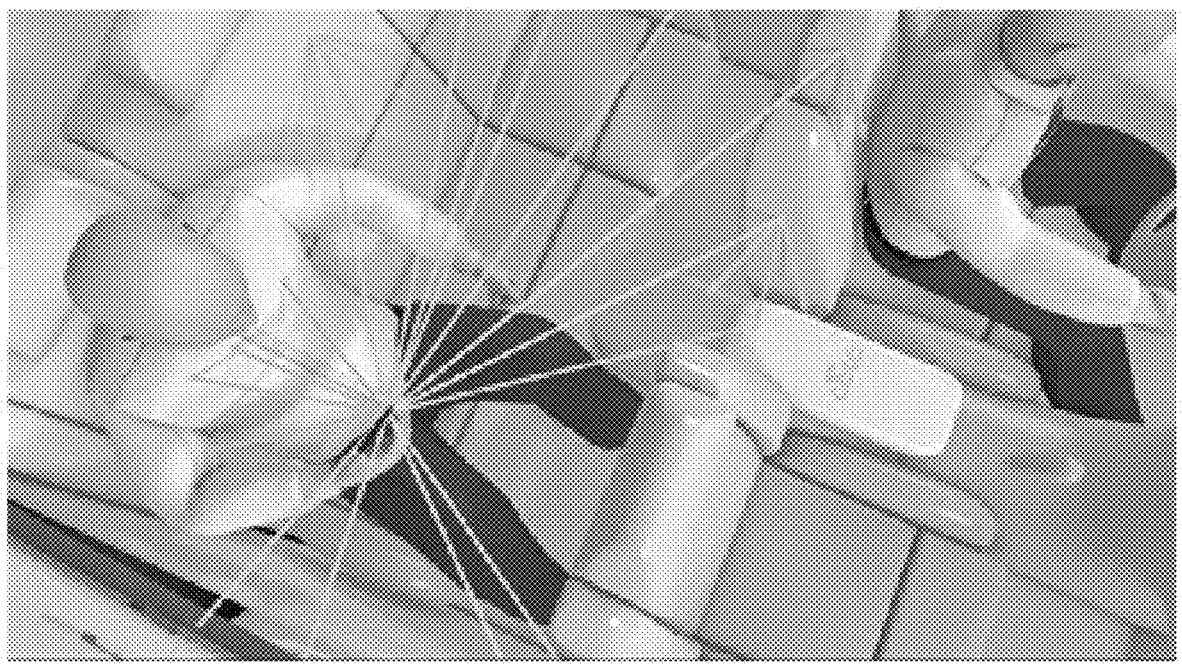
FIGS. 10A-10G depict example illustrations of transmissions within a vehicle leveraging the multipath environment, in accordance with some embodiments.

Referring first to FIG. 10A, a device (here a mobile device) is seen transmitting an omnidirectional signal (or beacon) requesting a charge. The omni-directional signal is presented here as a number of vectors emanating from the device in all directions. Some of the signals are lost through the car window due to the relative RF transparency of the glass. Other signals are absorbed by the passenger. The beacon signal generated by the device is relatively weak, generally lower in amplitude than the cellular signal emanating from the device already. Thus, it is entirely safe when absorbed by the passenger. However, signals that strike the interior surfaces of the vehicle that are more reflective, are bounced along alternate trajectories.

Figure 10B:

FIG. 10B depicts a second illustration at a subsequent point in time. In the example of FIG. 10B, reflected signals being dispersed in a number of directions is shown. Some of these signals are shown reaching the center console where the charging device is located. Other signals continue reflecting until their amplitude is diminished below a threshold, or are absorbed by the objects within the vehicle.

Figure 10C:
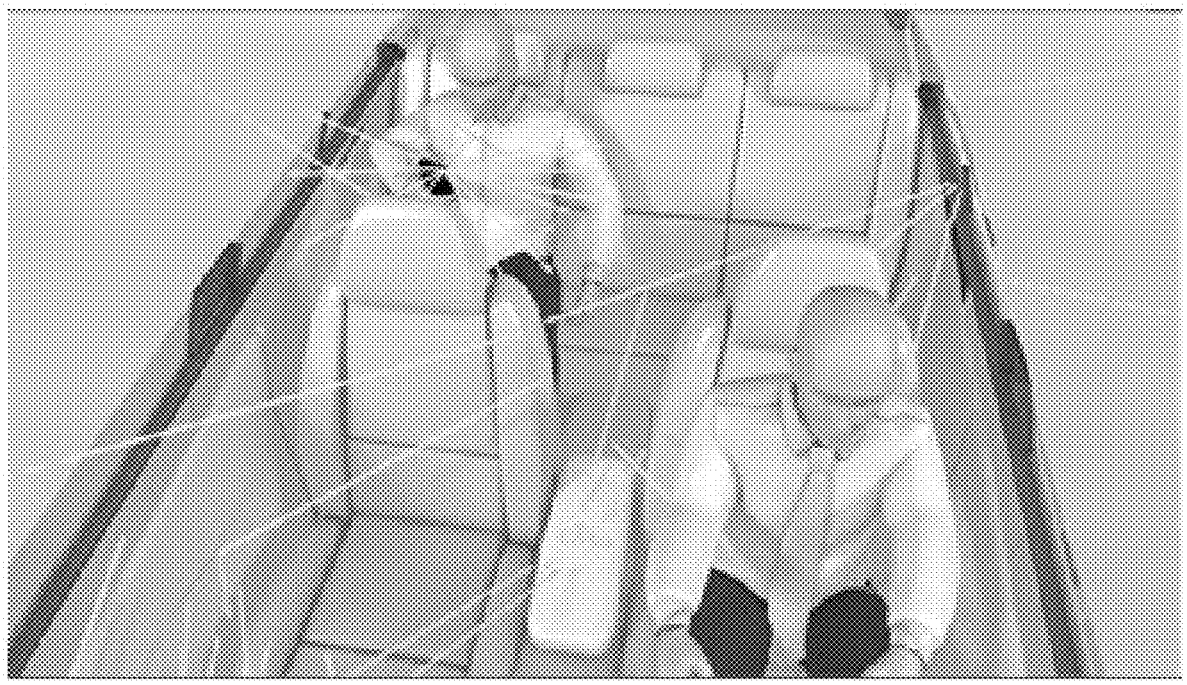

The device may send out multiple pulsed transmissions requesting power (e.g., beacons), as shown in FIG. 10C. Due to movement, some of these transmissions may vary from the previous trajectories, but alternate transmissions may be the same, or similar to the previous power request transmission. In this illustration, some of the reflected signals from the initial transmission are arriving at the charger from very different directions, while simultaneously a second omnidirectional transmission (e.g., beacon) is being initiated by the device requesting power.

Figure 10D:
Figure 10E:

The wireless charger compiles the various received signals to find similar phase information indicating relatively stable pathways between the device and the charger. In some embodiments, each antenna in the charger array determines the time and phase offset from the device. Then, each antenna of the charger array may be tuned, based upon this offset, in order to enable retransmission back along the identified "good" paths. FIG. 10D provides an illustration of this return transmission. As discussed herein, rather than the transmission being omnidirectional, only some directions (or paths) are utilized for the transmission. The total energy envelope of the transmission may be the same as an omnidirectional transmission, but the directional focusing may allow higher amplitude signals along the desired paths. These signals reflect from the same surfaces initially employed by the request signal, as shown in FIG. 10E.

Advantageously, the signals are focused on the device, and very little signal energy is lost through the glass windows or absorbed by the passengers.

Figure 10F:
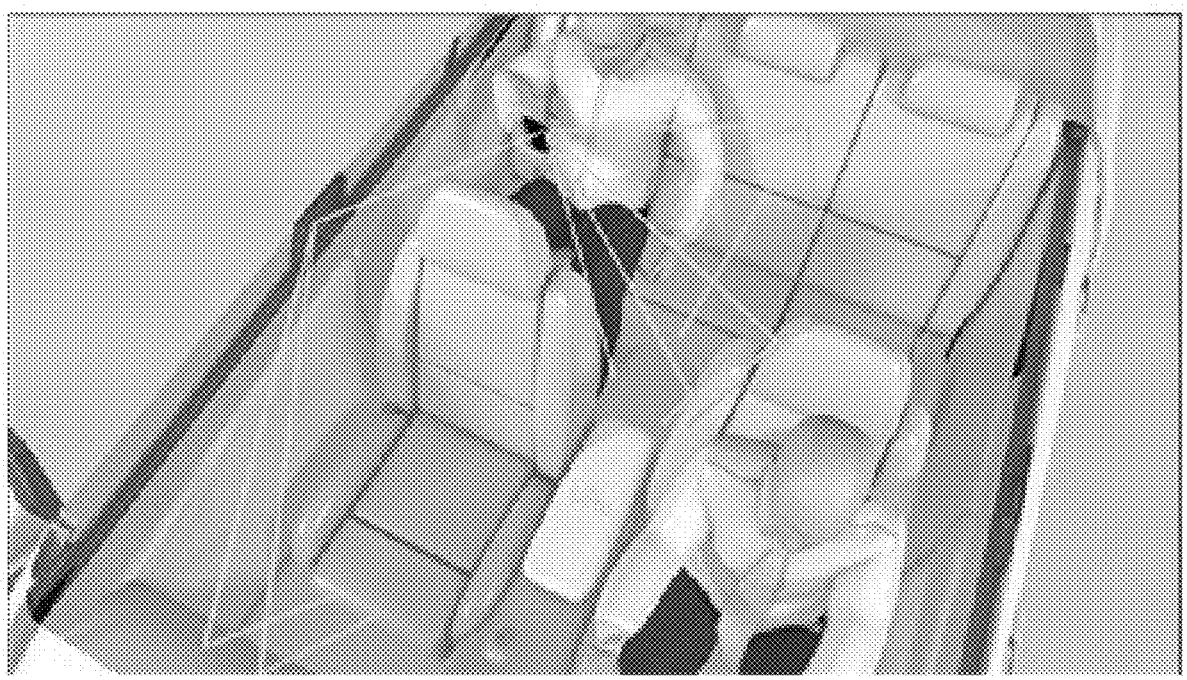
Figure 10G:
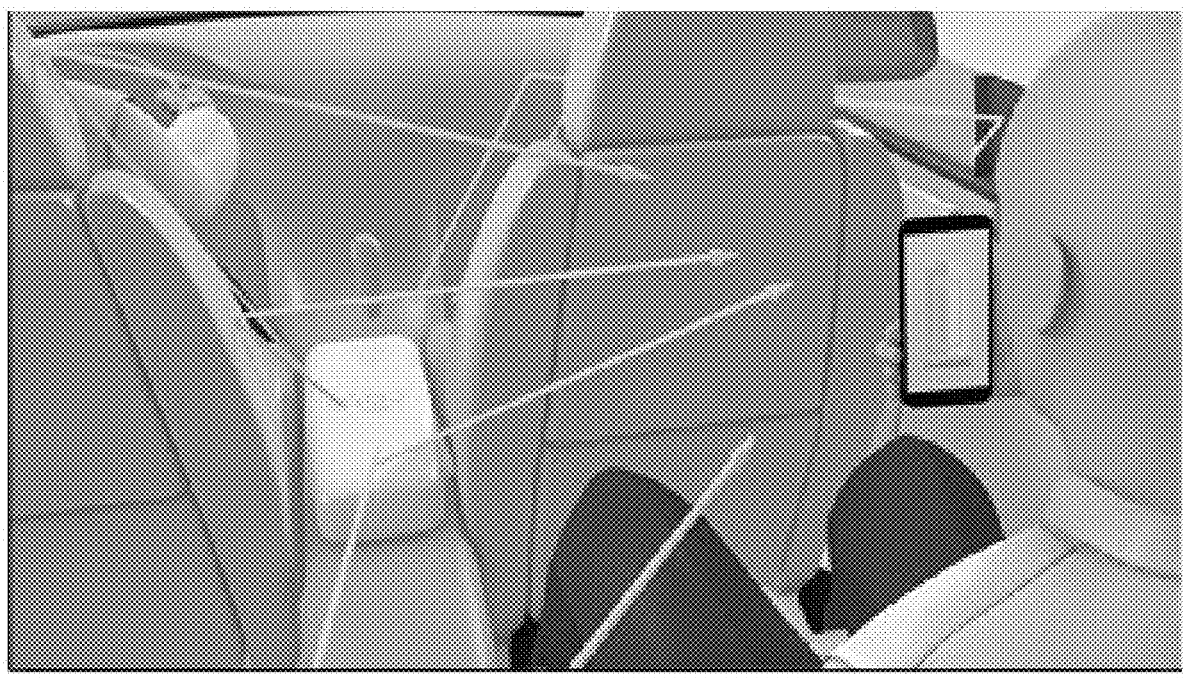

FIG. 10F provides the next image of this return transmission in the time series. Again, note that almost all transmissions terminate at the device rather than elsewhere within the vehicle. FIG. 10G provides yet another perspective of the received signals. As shown, due to the complex geometry within a vehicle, the transmissions may be reflected from very divergent trajectories.

Figure 11:
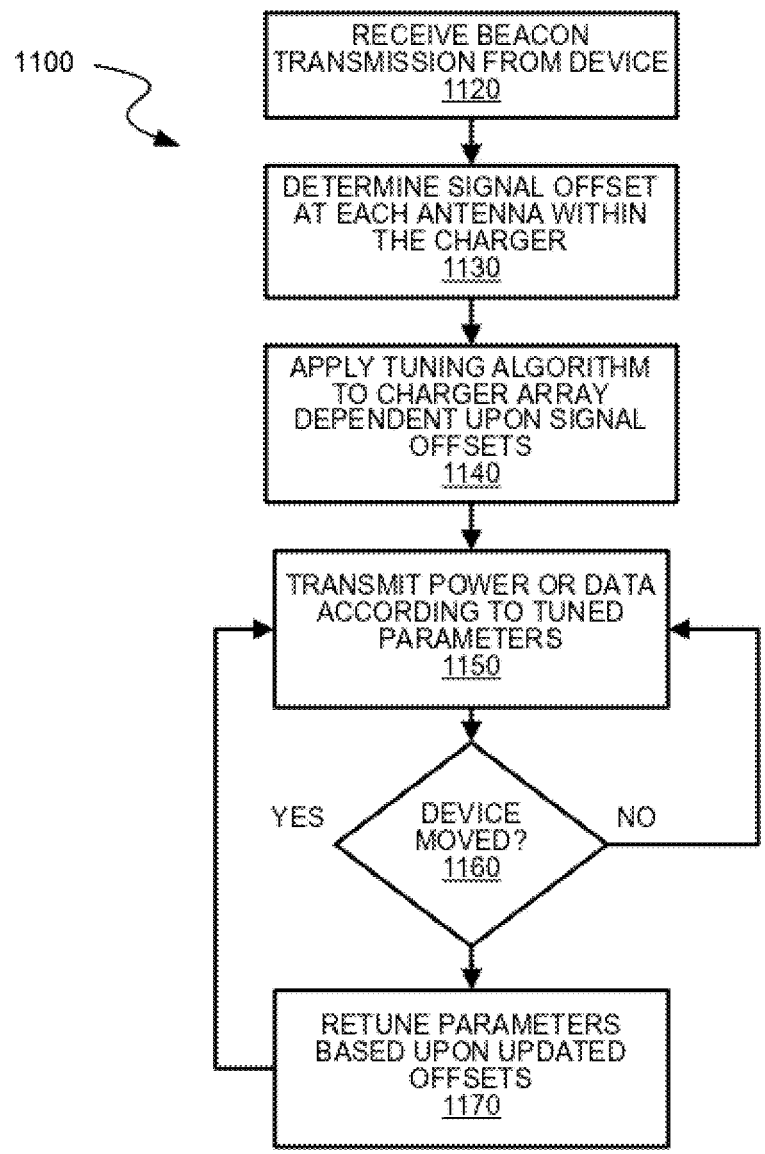
FIG. 11 depicts a flow diagram illustrating an example process for wireless power delivery within a multipath vehicle environment, in accordance with some embodiments.

FIG. 11 depicts a flow diagram illustrating an example process 1100 for wireless power delivery within a multipath vehicle environment, in accordance with some embodiments. One or more components of a wireless power transmission system (or charger) such as, for example, wireless power transmission system 101 of FIG. 1, or wireless power transmission system 300 of FIG. 3, can, among other functions, perform the example process 1100.

Initially a charger is deployed within the vehicle. The charger may be centrally located, such as within the center console. Alternatively, the charger may be located within the ceiling of the vehicle, under a seat, within the dashboard, or deployed at other suitable locations, including combinations or variations thereof. For example, in some embodiments, the vehicle may have a suite of chargers deployed within the interior, each focusing on a particular region, or otherwise working in tandem to deliver power. For simplicity of discussion, the example of FIG. 11 is discussed with reference to a single centrally located charger.

To begin, at 1120, the charger receives a beacon transmission from the device requesting power. At 1130, the beacon signal is utilized by the charger to determine time and phase offsets of the various antenna elements within the charging array. At 1140, the offsets between antenna elements are used by a tuning algorithm to set parameters for each antenna in the array. At 1150, the charger (or array) transmits power and/or data in accordance with the parameters.

As previously noted, by tuning in this manner the return transmission is focused back along the trajectories that the signals originated from. This corresponds to the most efficient pathways between the charger and original device. The paths limit exposure to human occupants of the vehicle and avoid other sources of signal loss. Thus, the signal received back at the device is much stronger than an omnidirectional signal would be, given a constant total power envelope for the transmission. As discussed herein, the system can periodically self-correct by listening for additional beacon signals from the device. At 1160, if the received signals have alternate offsets than previously detected, these offsets indicate that the device or something in the environment has changed. If so, the process may undergo a retuning process, at 1170, by leveraging the new offset data. In this manner, the transmissions remain focused on the device—even in dynamic environments.

Figure 12:
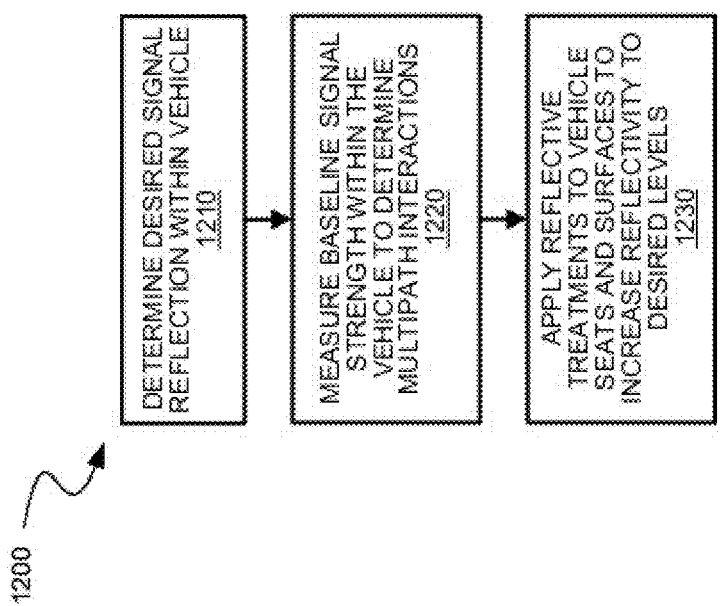
FIG. 12 depicts a flow diagram illustrating an example process for optimizing the surfaces within a vehicle to improve wireless power delivery therein, in accordance with some embodiments.

FIG. 12 depicts a flow diagram illustrating an example process 1200 for optimizing the surfaces within a vehicle to improve wireless power delivery therein, in accordance with some embodiments. More specifically, example process 1200 is provided for the calibration of a vehicle for optimal reflections of the energy transmissions. Such a process may be employed during the design phase for a vehicle with a wireless system integrated into its design or as an optional feature. The process begins with developing an understanding of where in the vehicle the signals should be focusing, where null regions are optimally located, and the overall reflection levels within the environment, at 110. Then a determination may be made of the actual signal reflections levels within the vehicle, at 1220. This may include the identification of 'hot spots' in locations where such amplifications are not desired.

Using this reflection information, additional reflection treatments may be incorporated into the vehicle design which optimizes the reflection levels, and modulates locations of hot spots to improve performance, at 1230. As previously noted, some locations may benefit the reflective properties of the vehicles interior without compromising cellular connectivity between a device and some external transmitter. These include incorporating metal wire mesh or screens into seat structures and/or floor mats. It may also be desirable to alter existing metal structural components of the vehicle such that the reflective surfaces are oriented at different angles to move the location of hot spots if they are in undesired locations.

Figure 13:
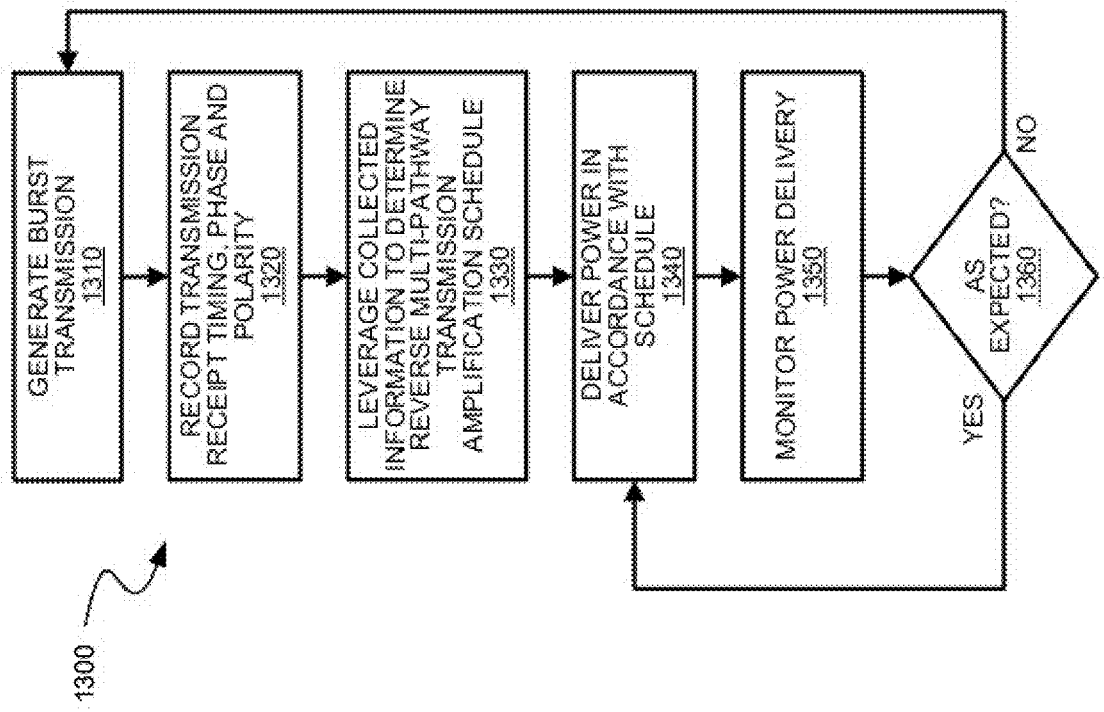
FIG. 13 depicts a flow diagram illustrating an example process for generating a multi-path schedule for wireless power delivery within a vehicle, in accordance with some embodiments.

FIG. 13 depicts a flow diagram illustrating an example process 1300 for generating a multi-path schedule for wireless power delivery within a vehicle, in accordance with some embodiments. More specifically, example process 1300 describes an optimization of signal focusing using time and phase delays. This example process is known as multipath focusing of signals, and is a further clarification of step 1140 of FIG. 11. One or more components of a wireless power transmission system (or charger) such as, for example, wireless power transmission system 101 of FIG. 1, or wireless power transmission system 300 of FIG. 3, can, among other functions, perform the example process 1300.

Initially, at 1310, the transmitter sends a pulsed signal (or burst). The receiver records the transmission including information such as timing, phase of the received waves, polarity frequency, etc., at 1320. This collected information may be employed to generate a transmission schedule, at 1330, which is the inverse timing of the signal receipt, and phase adjusted such that all the signals are received in phase to one another.

The power is then transmitted in accordance to the generated schedule, at 1340. When possible, the receiver of the power transmission may monitor the delivered power, at 1350, and report back the results to the charger. If the power received continues to be as expected, the power schedule may be repeated indefinitely. However, if the power received is not according to expectations, at 1360, then something within the environment has changed which has resulted in an alteration of the pathway. In such circumstances, a new pulse may be transmitted to update the powering transmission schedule. It should be noted that because the environment is rarely static, in some implementations, set-up transmissions are requested every pre-determined time interval rather than through feedback of power delivered. In some embodiments, intervals are typically between 100 ms and 5 seconds. If an environment proves to be very slow to change, so that more than two set-up sequences are repeated with very similar results, then the time interval between requests for set-up may be increased to reduce power that is being wasted by asking for set-up sequences too frequently.

Figure 14:
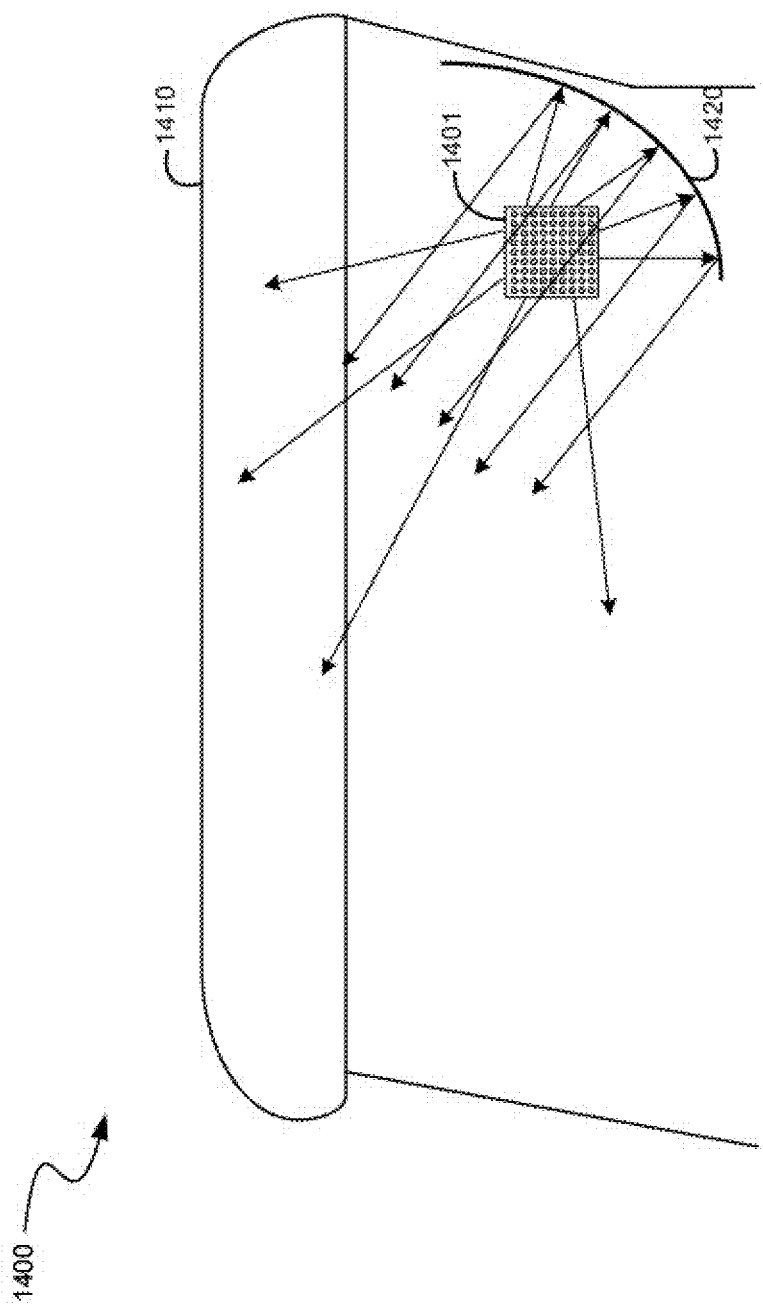
FIG. 14 depicts a diagram illustrating an example console for directionally focusing a charger, in accordance with some embodiments.

FIG. 14 depicts a diagram illustrating an example console 1400 for directionally focusing a charger, in accordance with some embodiments. More specifically, in addition to utilizing reflective surfaces throughout the vehicle's interior and relying on multipath focusing of signals for power delivery, it is also possible to generate a charger console unit that is capable of targeting power delivery to desired power locations. FIG. 14 depicts an example illustration of a center console 1400 for a vehicle that incorporates a wireless power transmission system (or charger) 1401 within the arm rest 1410. The wireless power transmission system 1401 can be, for example, wireless power transmission system 101 of FIG. 1, or wireless power transmission system 300 of FIG. 3, although alternative configurations are possible.

Arm rest 1410 may be comprised of relatively transparent material for the form of energy being transmitted. For example, for RF transmissions, the console may include thinner materials with limited inclusion of metals. Alternatively, for acoustic transmissions, the console may be configured to resonate with the transmission frequency. Thus, console 1400 construction may be dependent upon the medium of energy transfer from the charger 1401.

In the example of FIG. 14, the charger 1401 includes an array of RF antenna that allows for the determination of direction of incoming signals. As discussed herein, the charger may also enable beamforming to orient outgoing transmissions as illustrated in the examples of FIGS. 10A-10G. In addition to, or as an alternative to beamforming, the console may also incorporate specifically shaped reflectors that allow for targeting of transmissions. In such instances, the console 1400 includes a parabolic or hyperbolic reflector 1420 that causes some of the transmissions from an omnidirectional transmitting charger 1401 to be reflected in parallel in a forward and upward direction. In some embodiments, the direction may directly face the 'sweet spot' of the console and dashboard where a user is likely to place a device. As this reflector only covers a portion of the area of the charger, other locations within the vehicle may also receive signals, but at a lower intensity as compared to the targeted regions. Even when employing an array, where each antenna is tuned in to generate directional/focused signals, the process generates "side lobes" of signal. A backing reflector may limit the loss of such inadvertent side lobes by redirecting these signals out into the environment.

Figure 15:
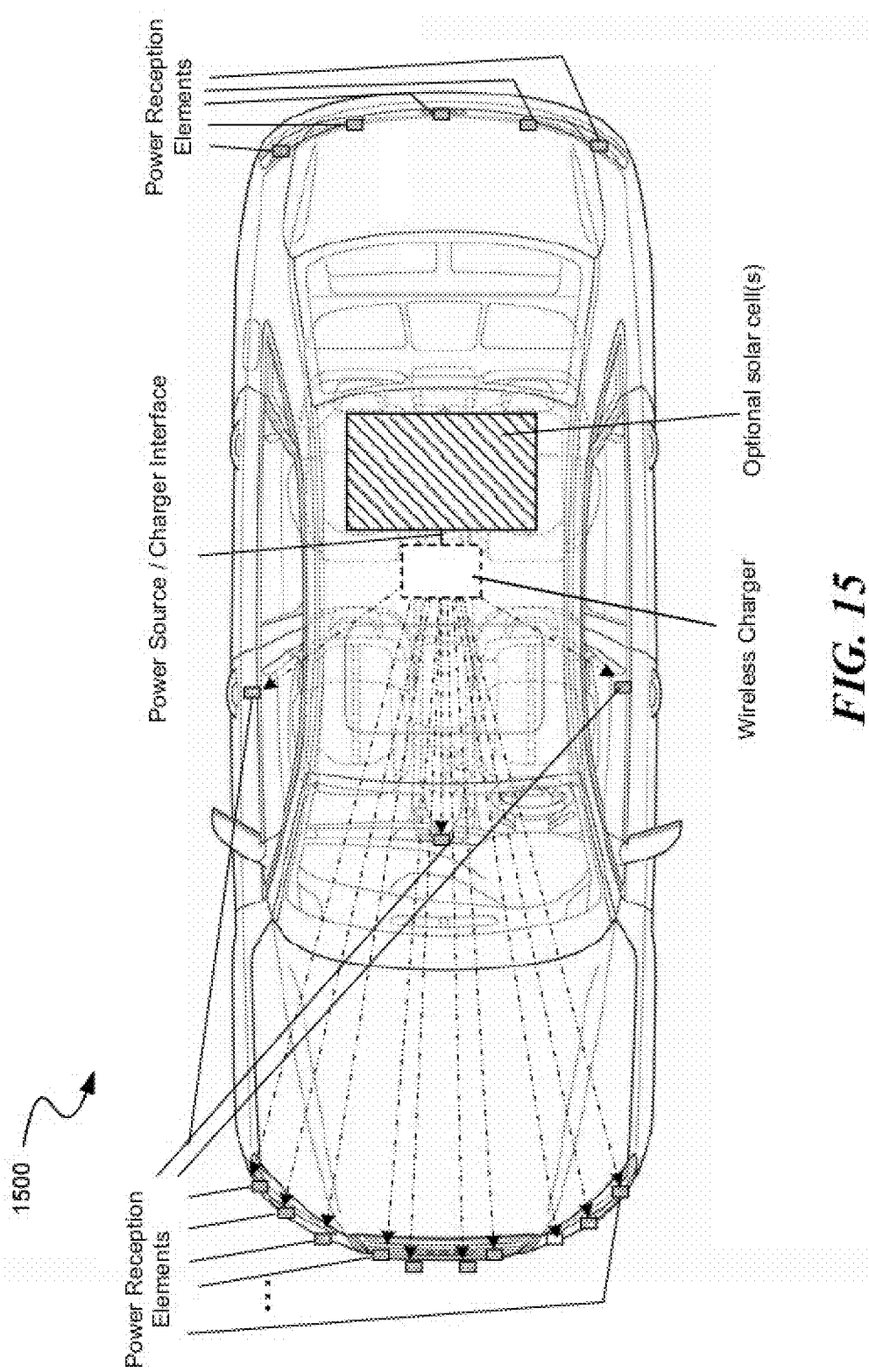
FIG. 15 is a diagram illustrating an example vehicle having an embedded or integrated fixed-point wireless charging system (or wireless charger) for powering in-car circuitry (e.g., power reception elements), according to some embodiments.

FIG. 15 is a diagram illustrating an example vehicle 1500 having an embedded or integrated fixed-point wireless charging system (or wireless charger) for powering in-car circuitry (e.g., power reception elements), according to some embodiments. As shown in the example of FIG. 15, the wireless charger is built into the roof of the vehicle; however, it is appreciated that one or more fixed-point wireless chargers can be integrated into almost any portion of the vehicle. For example, a fixed-point wireless charger could be designed and integrated into a dashboard of the vehicle and powered-by the vehicle's existing battery. Alternatively or additionally, and as shown, a fixed-point wireless charger can be built into the roof of vehicle and powered by solar panels integrated into the roof of the vehicle.

It is also appreciated that, in some embodiments, a wireless charger can operate to deliver wireless power to both (non-beaconing) fixed-point power reception elements and mobile (beaconing) power reception clients, e.g., power receivers built into mobile devices, etc. In some embodiments, the locations of the fixed-point power reception elements can be pre-configured, e.g., at installation and/or configuration time of the wireless charger.

Additional Vehicle Embodiments

By way of example, and not limitation, a vehicle as described herein, can comprise, among other things, a car, a spaceship, a train, a hyperloop system, a bus, an airplane, etc. As previously discussed, the techniques and systems described herein can reduce wiring and, thus, reduce technical issues and/or deployment costs for wireless powered electronic circuitry and/or functionality in any of these environments. Furthermore, in some embodiments, e.g., spacecraft embodiments, having both wired and wireless power options might be beneficial for system redundancy.

Figure 16:
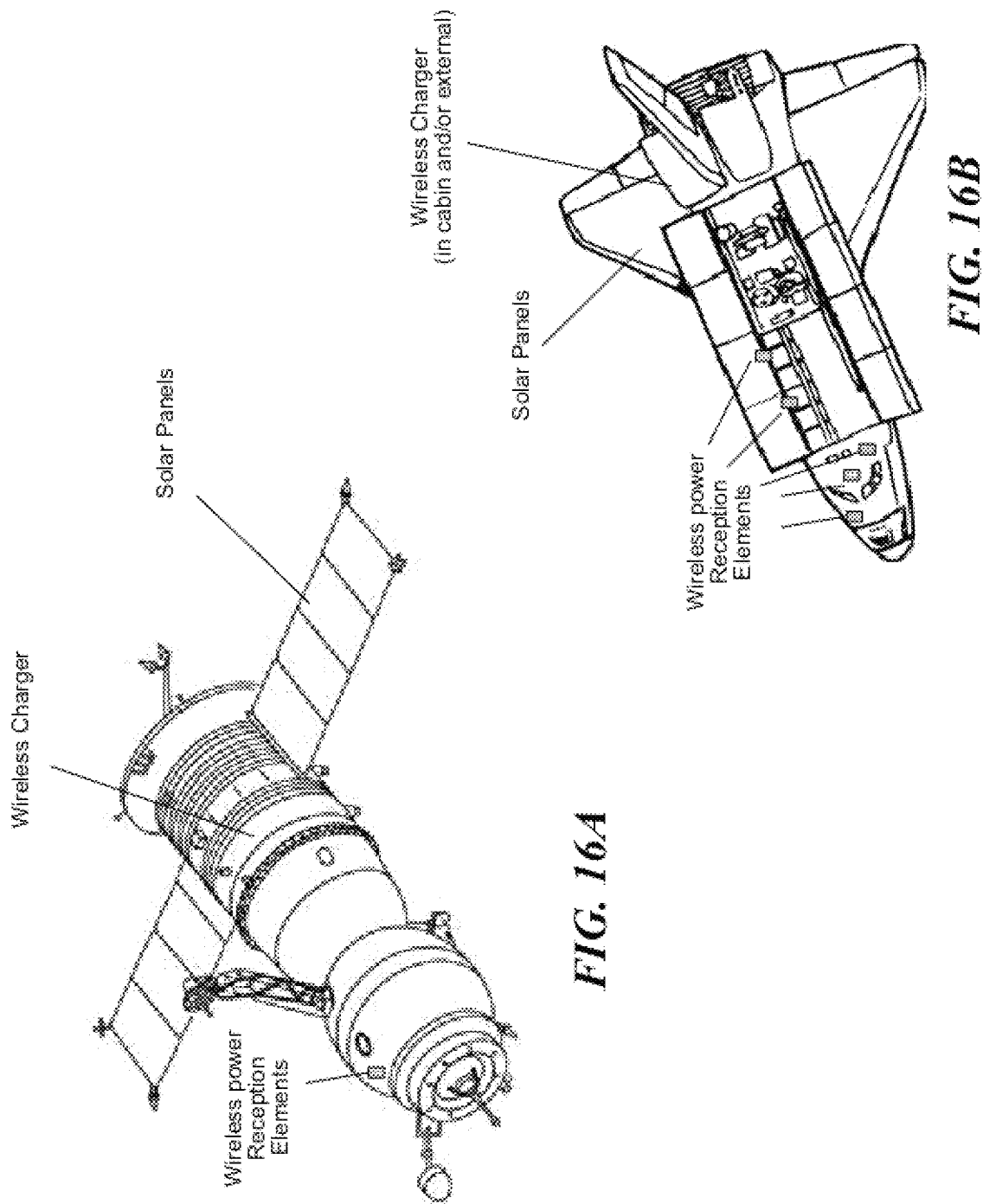
FIGS. 16A and 16B depict various example space vehicles with integrated wireless chargers (for fixed point charger and/or non-fixed point charging).

FIGS. 16A and 16B depict various example space vehicles with integrated wireless chargers (for fixed point charger and/or non-fixed point charging). As discussed above, the wireless chargers can power in-vehicle electronic circuitry without the need to provide wiring throughout. Alternatively or additionally, as discussed above, the wireless charging can be used as part of a failsafe or redundancy mechanism.

Figures 17, 18:
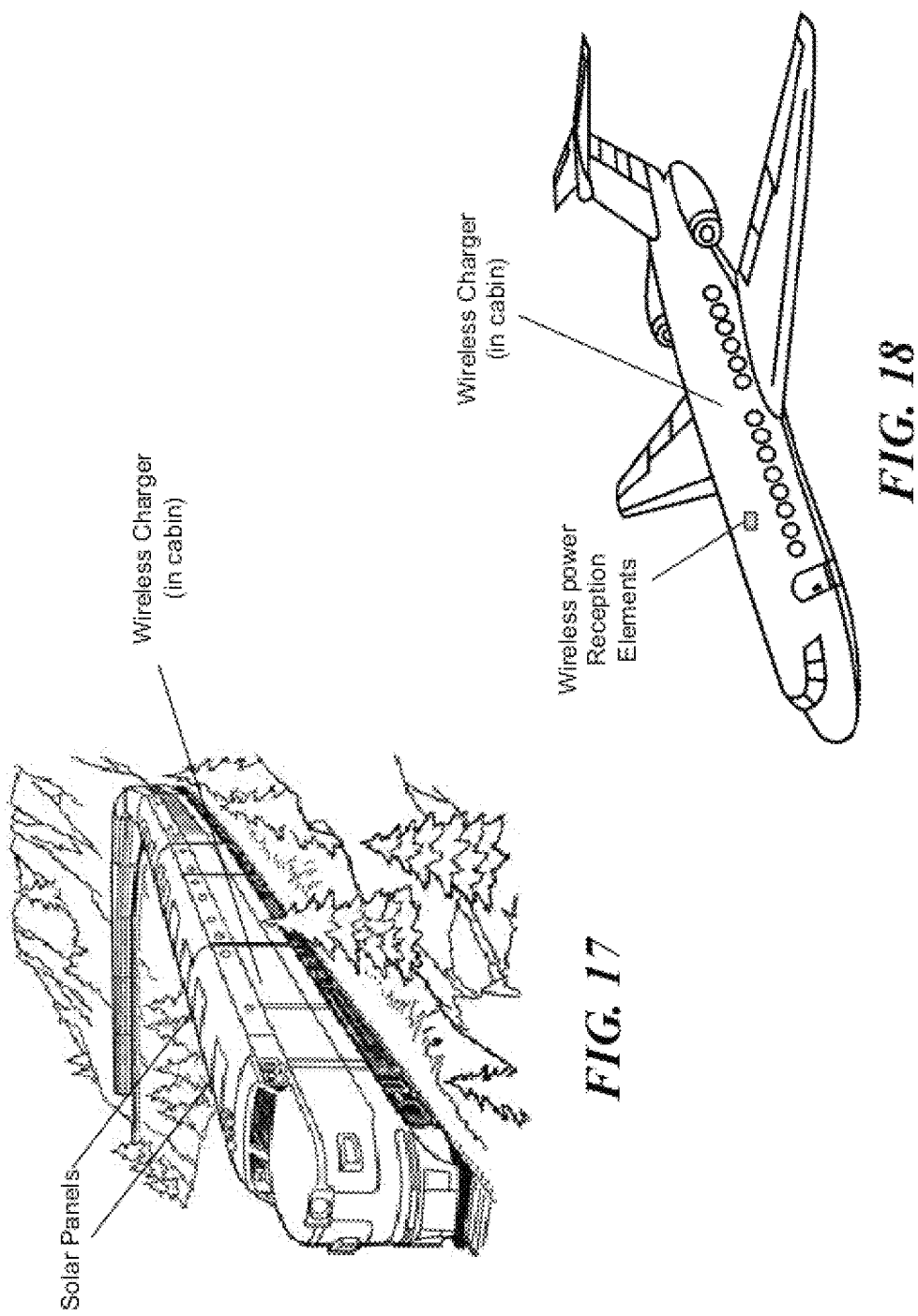
FIGS. 17-19 depict various additional example deployments of vehicles with integrated wireless chargers (for fixed point charger and/or non-fixed point charging), according to some embodiments.
Figure 19:
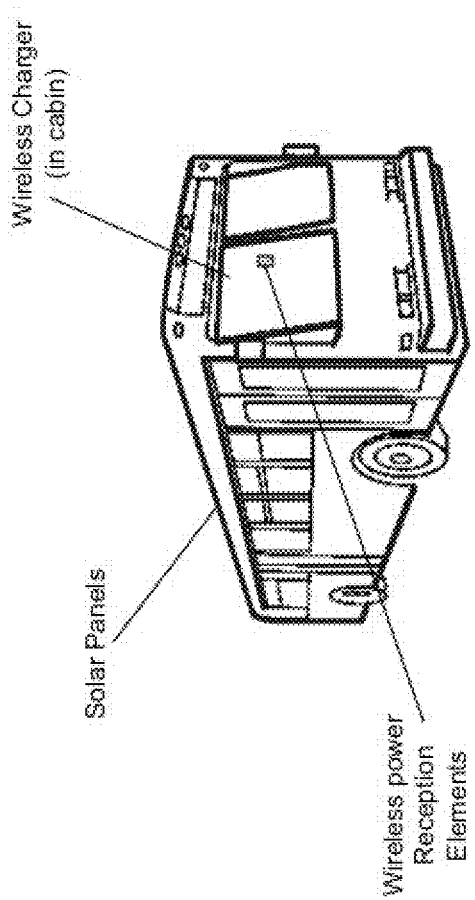

FIGS. 17-19 depict various additional example deployments of vehicles with integrated wireless chargers (for fixed point charger and/or non-fixed point charging), according to some embodiments.

Figure 20:
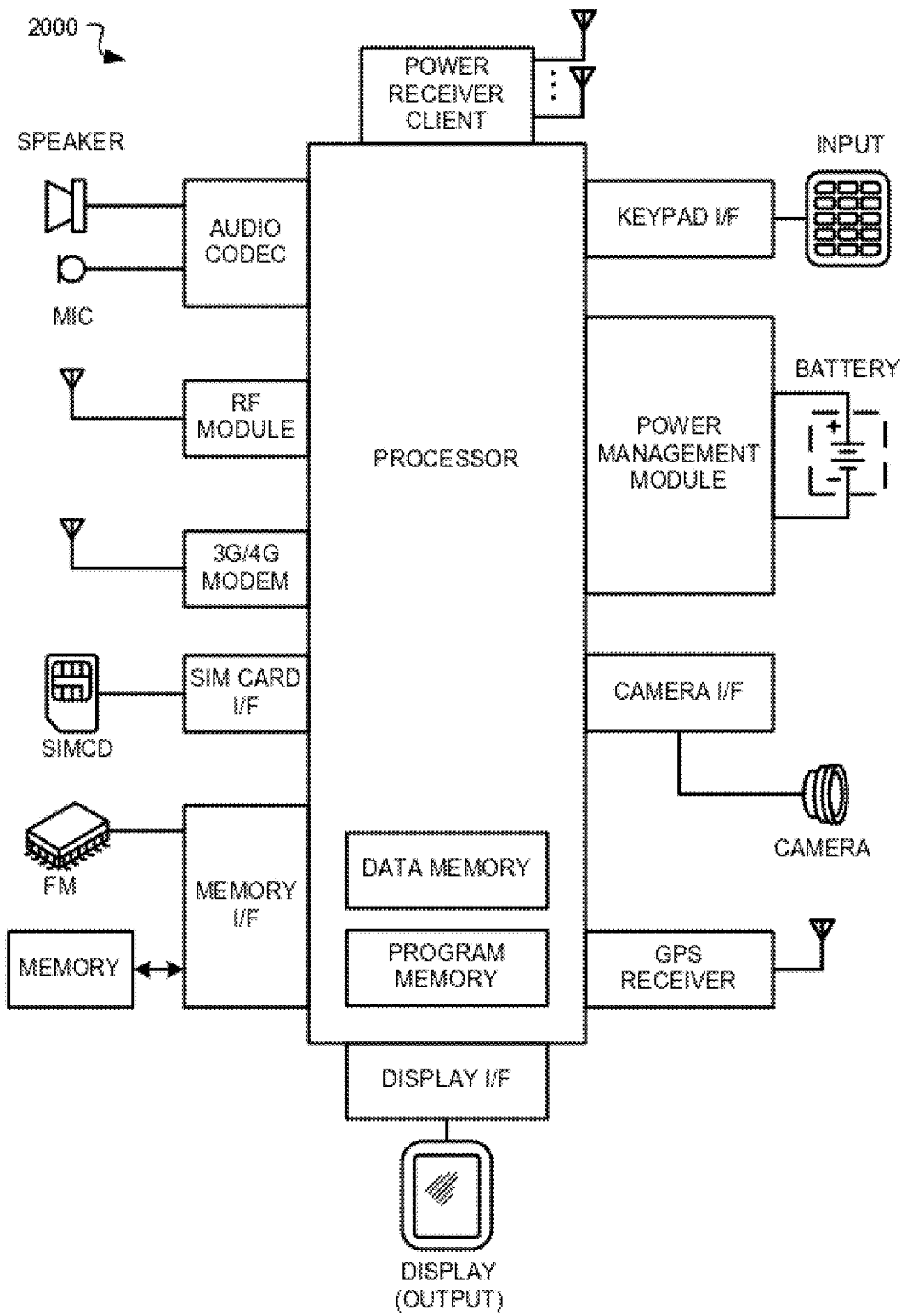
FIG. 20 depicts a block diagram illustrating example components of a representative mobile device or tablet computer with one or more wireless power receiver clients in the form of a mobile (or smart) phone or tablet computer device in accordance with some embodiments.

FIG. 20 depicts a block diagram illustrating example components of a representative mobile device or tablet computer 2000 with a wireless power receiver or client in the form of a mobile (or smart) phone or tablet computer device, according to an embodiment. Various interfaces and modules are shown with reference to FIG. 20, however, the mobile device or tablet computer does not require all of the modules or functions for performing the functionality described herein. It is appreciated that, in many embodiments, various components are not included and/or necessary for operation of the category controller. For example, components such as Global Positioning System (GPS) radios, cellular radios, and accelerometers may not be included in the controllers to reduce costs and/or complexity. Additionally, components such as ZigBee™ radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 21:
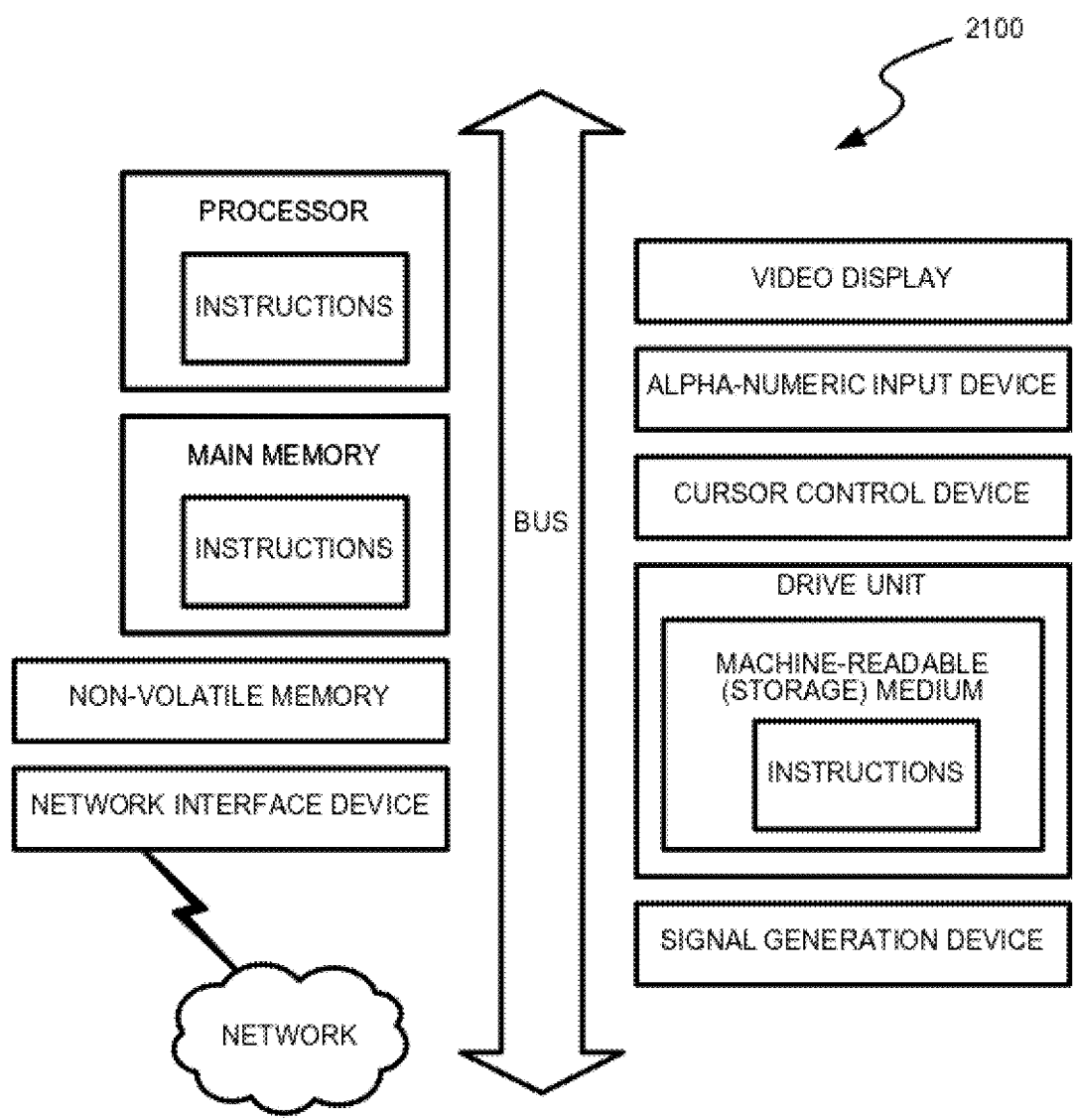
FIG. 21 depicts a diagrammatic representation of a machine, in the example form, of a computer system within which a set of instructions, for causing the machine to perform any one or more of the methodologies discussed herein, may be executed.

FIG. 21 depicts a diagrammatic representation of a machine, in the example form, of a computer system within which a set of instructions, for causing the machine to perform any one or more of the methodologies discussed herein, may be executed.

In the example of FIG. 21, the computer system includes a processor, memory, non-volatile memory, and an interface device. Various common components (e.g., cache memory) are omitted for illustrative simplicity. The computer system 2100 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 21 reside in the interface.

In operation, the computer system 2100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method comprising:
   determining a received signal strength of a radio frequency (RF) signal received via a plurality of paths at two or more antennas of a plurality of antennas of an antenna array;
   configuring parameters of the plurality of antennas for transmission of a wireless power signal over one or more paths of the plurality of paths for which the respective received signal strength is determined to exceed a threshold value; and
   directing at least a portion of the plurality of antennas to transmit the wireless power signal over the one or more paths according to the parameters.

2. The method of claim 1, further comprising directing at least one of the plurality of antennas to transmit a data signal according to the parameters.

3. The method of claim 1 further comprising determining, based on the received signal strength, one or more least lossy paths of the plurality of paths,
   wherein directing the at least a portion of the plurality of antennas to transmit the wireless power signal comprises directing the at least a portion of the plurality of antennas to transmit the wireless power signal using the one or more least lossy paths.

4. The method of claim 1 further comprising determining at least one time, or phase, offset of the RF signal received via the plurality of paths,
   wherein configuring the parameters of the plurality of antennas for transmission of the wireless power signal comprises configuring the parameters based on the at least one time, or phase, offset.

5. The method of claim 4, wherein:
   determining at least one time, or phase, offset of the RF signal comprises determining at least one time offset of the RF signal; and
   configuring the parameters of the plurality of antennas for transmission of the wireless power signal comprises configuring the parameters based on the at least one time offset.

6. The method of claim 4, wherein:
   determining at least one time, or phase, offset of the RF signal comprises determining at least one phase offset of the RF signal; and
   configuring the parameters of the plurality of antennas for transmission of the wireless power signal comprises configuring the parameters based on the at least one phase offset.

7. The method of claim 4, wherein:
   determining at least one time, or phase, offset of the RF signal comprises determining at least one time offset, and at least one phase offset, of the RF signal; and
   configuring the parameters of the plurality of antennas for transmission of the wireless power signal comprises configuring the parameters based on: the at least one time offset, and the at least one phase offset.

8. The method of claim 1 further comprising periodically focusing wireless power signal transmissions on one or more fixed locations within a wireless power delivery environment.

9. The method of claim 1 further comprising identifying the one or more paths for which the received signal strength exceeds the threshold value.

10. A system comprising:
    an antenna array including a plurality of antennas;
    control circuitry coupled to the antenna array, and configured to:
      determine a received signal strength of a radio frequency (RF) signal received via a plurality of paths at two or more antennas of the plurality of antennas;
      configure parameters of the plurality of antennas for transmission of a wireless power signal over one or more paths of the plurality of paths for which the respective received signal strength is determined to exceed a threshold value; and
      direct at least a portion of the plurality of antennas to transmit the wireless power signal over the one or more paths according to the parameters.

11. The system of claim 10, wherein the control circuitry is further configured to direct the two or more antennas to transmit a training signal.

12. The system of claim 11, wherein the control circuitry is further configured to determine at least one of timing, and phase, information for at least one signal received by the antenna array in response to the training signal.

13. The system of claim 12, wherein to determine the at least one of timing, and phase, information, the control circuitry is further configured to determine timing information for the at least one signal.

14. The system of claim 13, wherein to configure the parameters of the plurality of antennas for transmission of the wireless power signal, the control circuitry is further configured to configure the parameters based on the timing information.

15. The system of claim 12, wherein to determine at least one of: timing, and phase, information, the control circuitry is further configured to determine phase information for the at least one signal.

16. The system of claim 15, wherein to configure the parameters of the plurality of antennas for transmission of the wireless power signal, the control circuitry is further configured to configure the parameters based on the phase information.

17. The system of claim 12, wherein to determine at least one of: timing, and phase, information, the control circuitry is further configured to determine: timing information, and phase information, for the at least one signal.

18. The system of claim 17, wherein to configure the parameters of the plurality of antennas for transmission of the wireless power signal, the control circuitry is further configured to configure the parameters based on: the timing information, and the phase information.

19. The system of claim 12, wherein:
    the control circuitry is further configured to generate a wireless power signal transmission schedule based on the at least one of: timing, and phase, information for the at least one signal; and
    to direct the at least a portion of the plurality of antennas to transmit the wireless power signal, the control circuitry is further configured to direct the at least a portion of the plurality of antennas to transmit the wireless power signal further according to the wireless power signal transmission schedule.

20. One or more non-transitory computer readable media storing program instructions which, when executed by at least one processor, cause a machine to:
- determine a received signal strength of a radio frequency (RF) signal received via a plurality of paths at two or more antennas of a plurality of antennas of an antenna array;
- configure parameters of the plurality of antennas for transmission of a wireless power signal over one or more paths of the plurality of paths for which the respective received signal strength is determined to exceed a threshold value; and
- direct at least a portion of the plurality of antennas to transmit the wireless power signal over the one or more paths according to the parameters.

* * * * *